March 31, 1964 R. BROWN, JR 3,127,028
APPARATUS FOR STRINGING TOBACCO LEAVES AND THE LIKE
Filed July 13, 1959 12 Sheets-Sheet 1
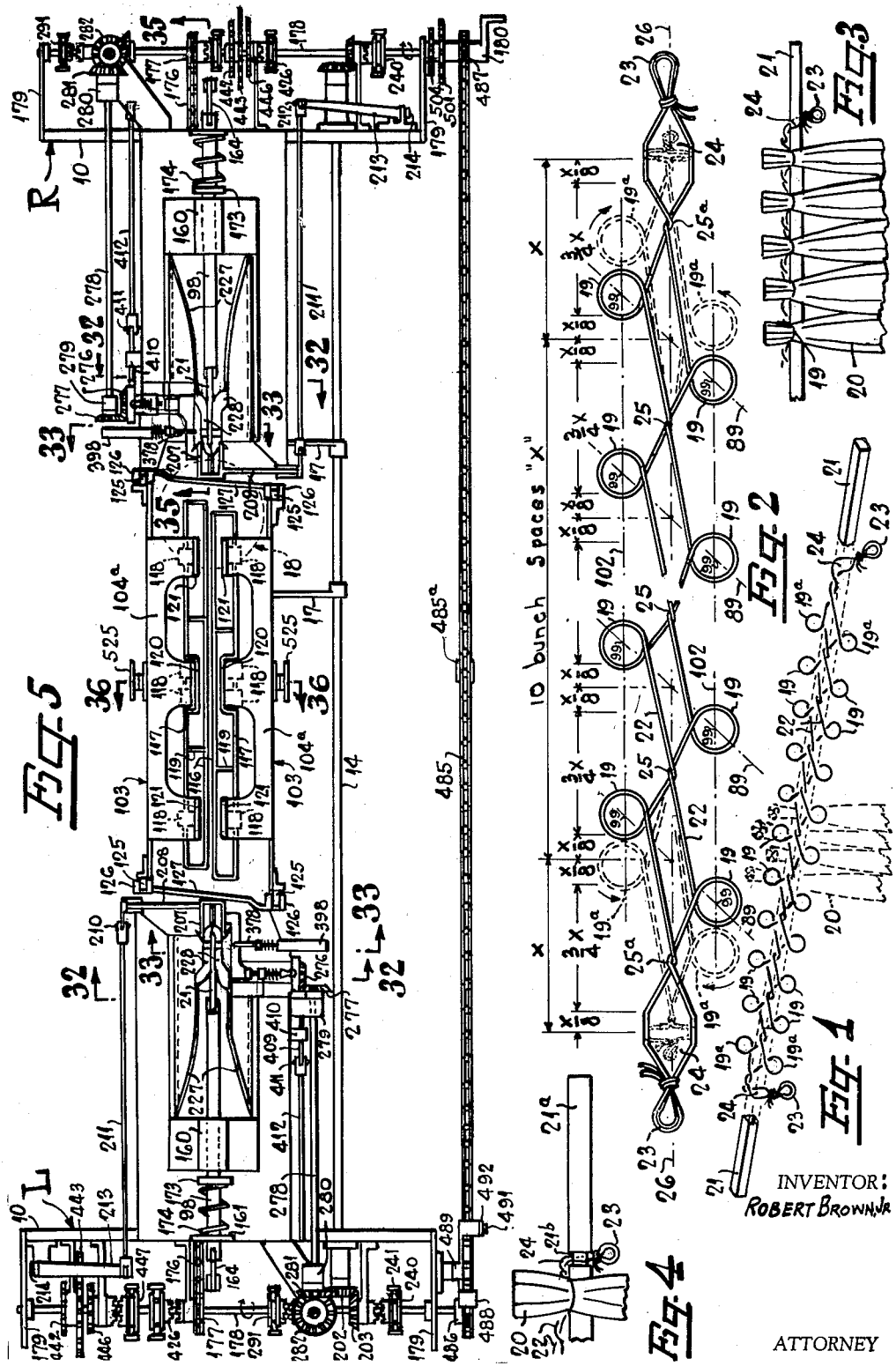
INVENTOR:
ROBERT BROWN, JR
ATTORNEY

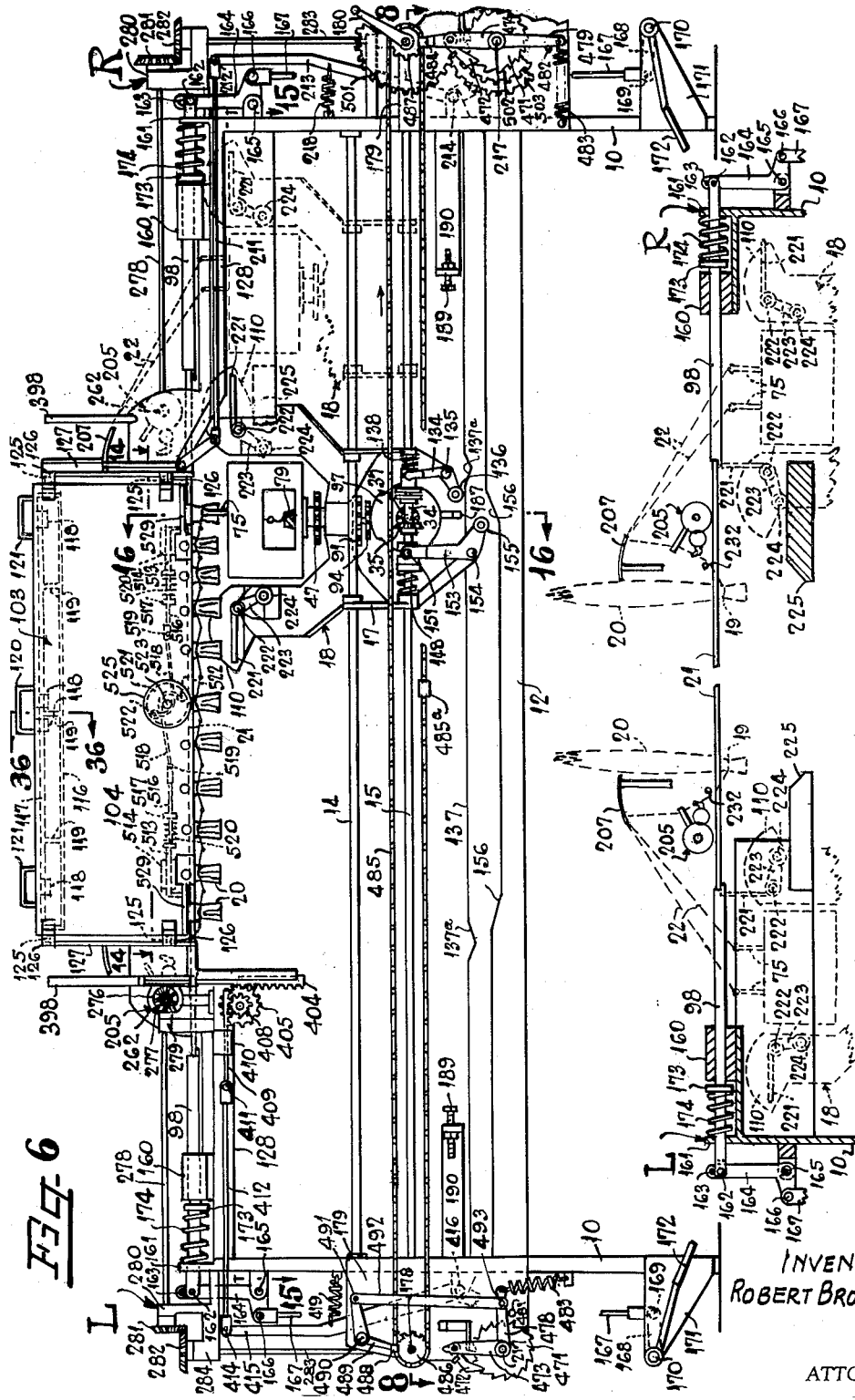

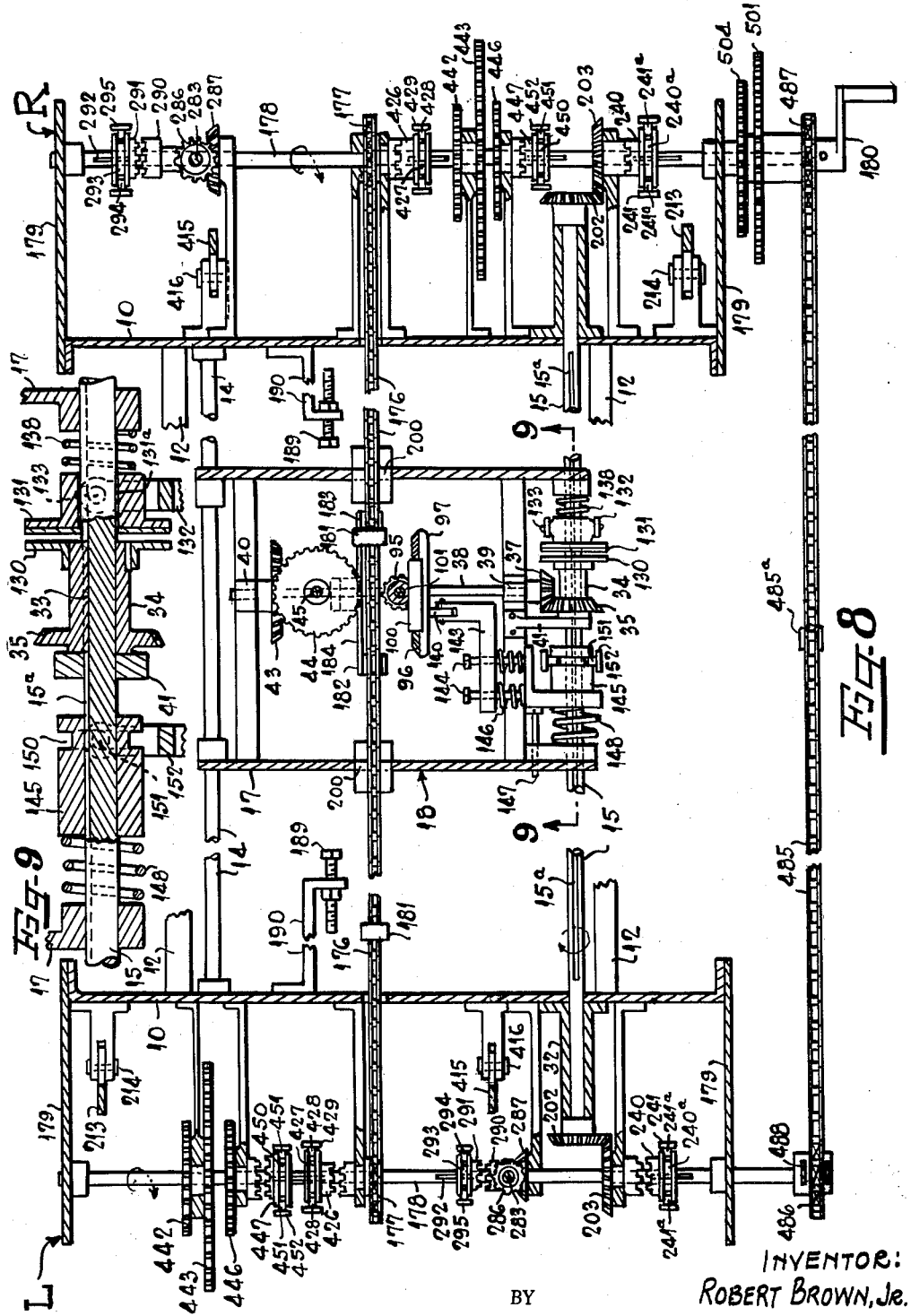

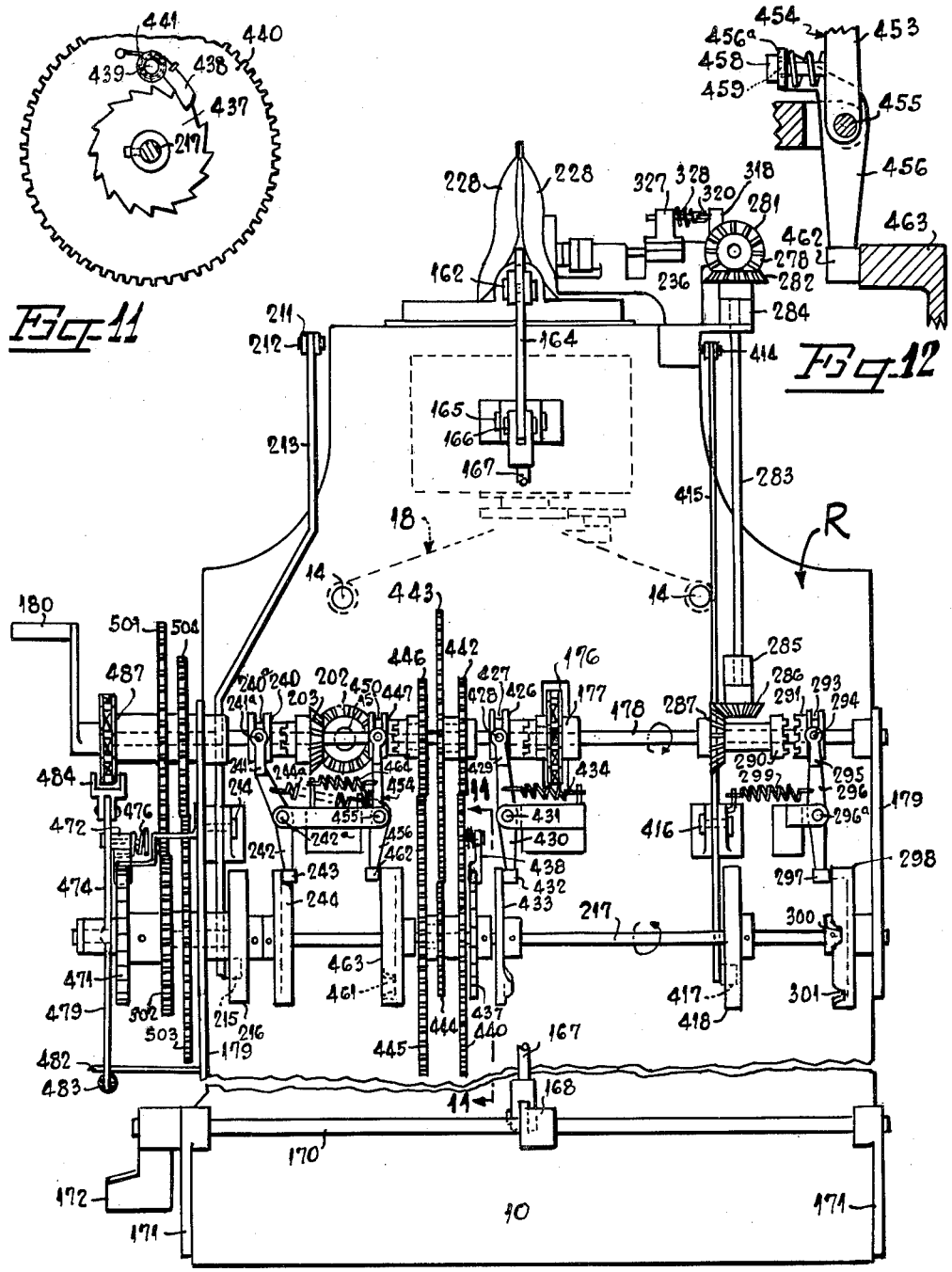

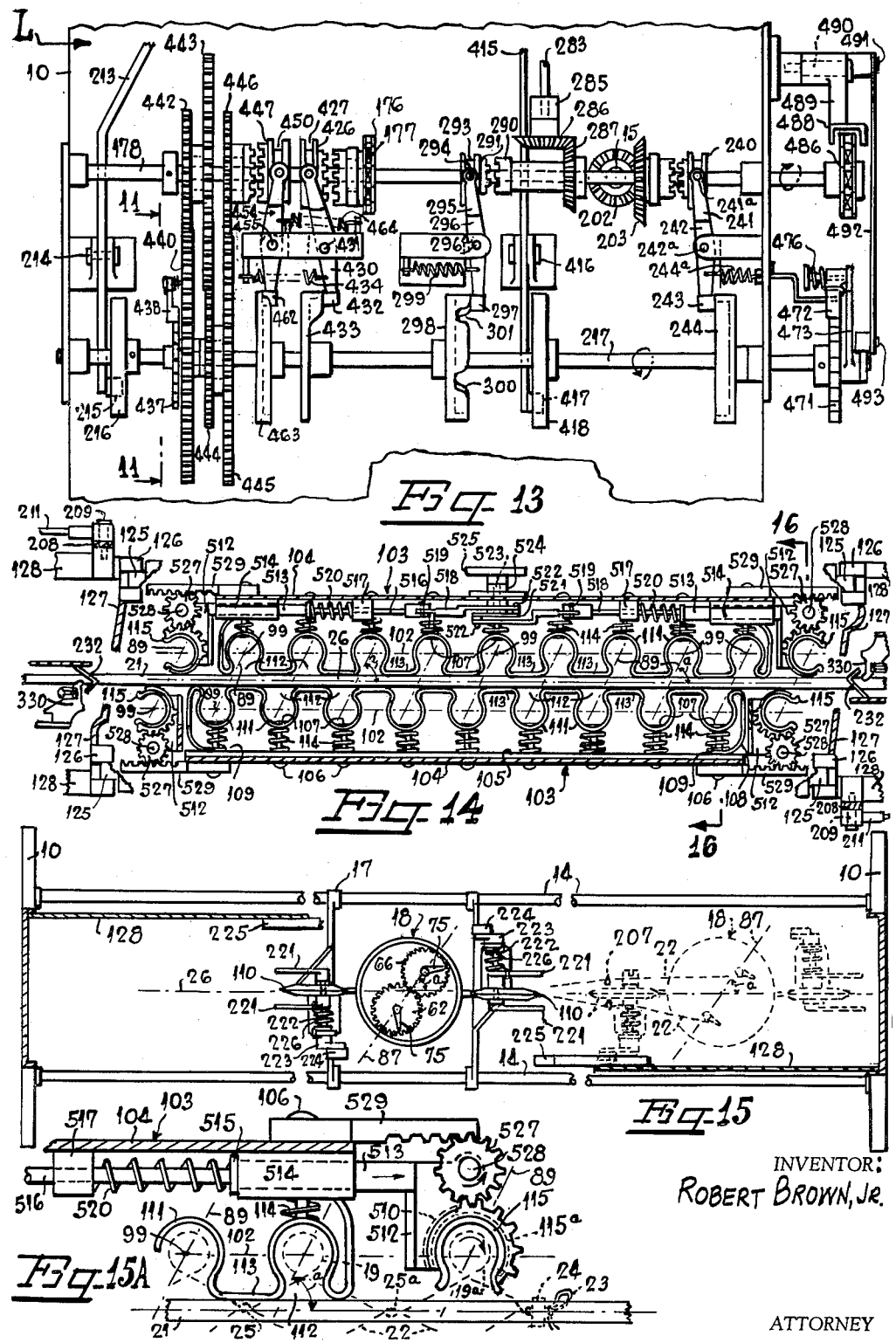

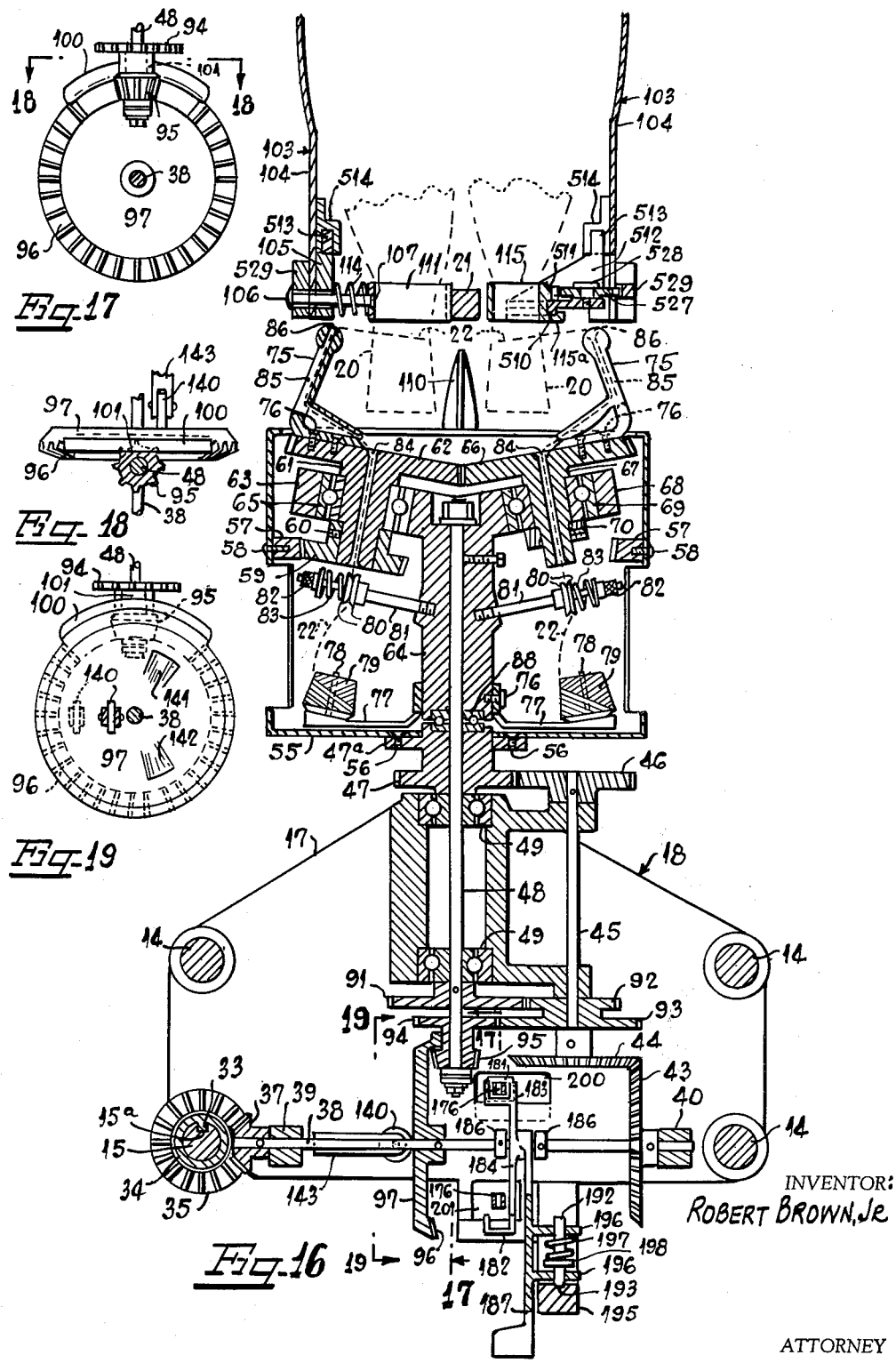

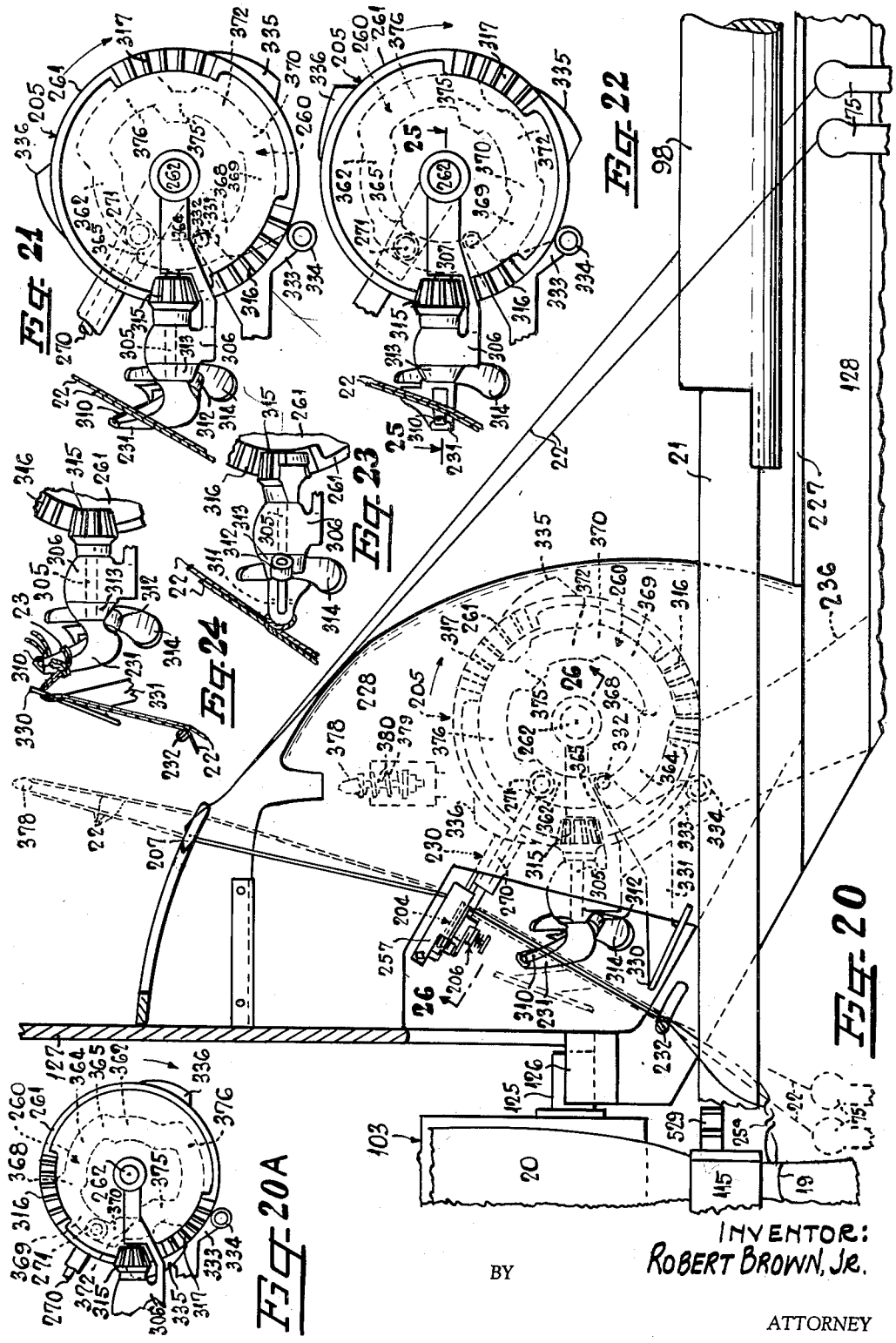

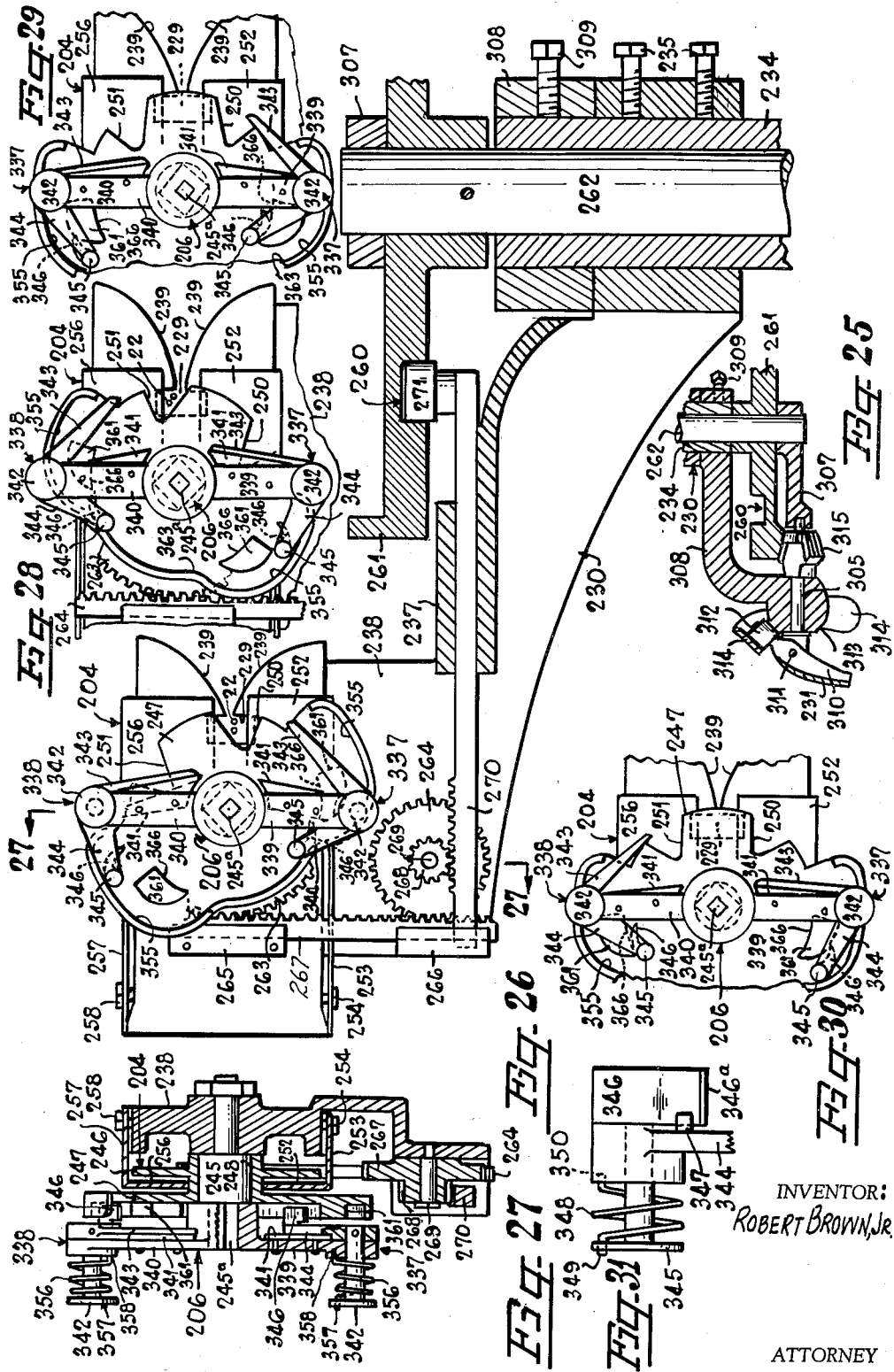

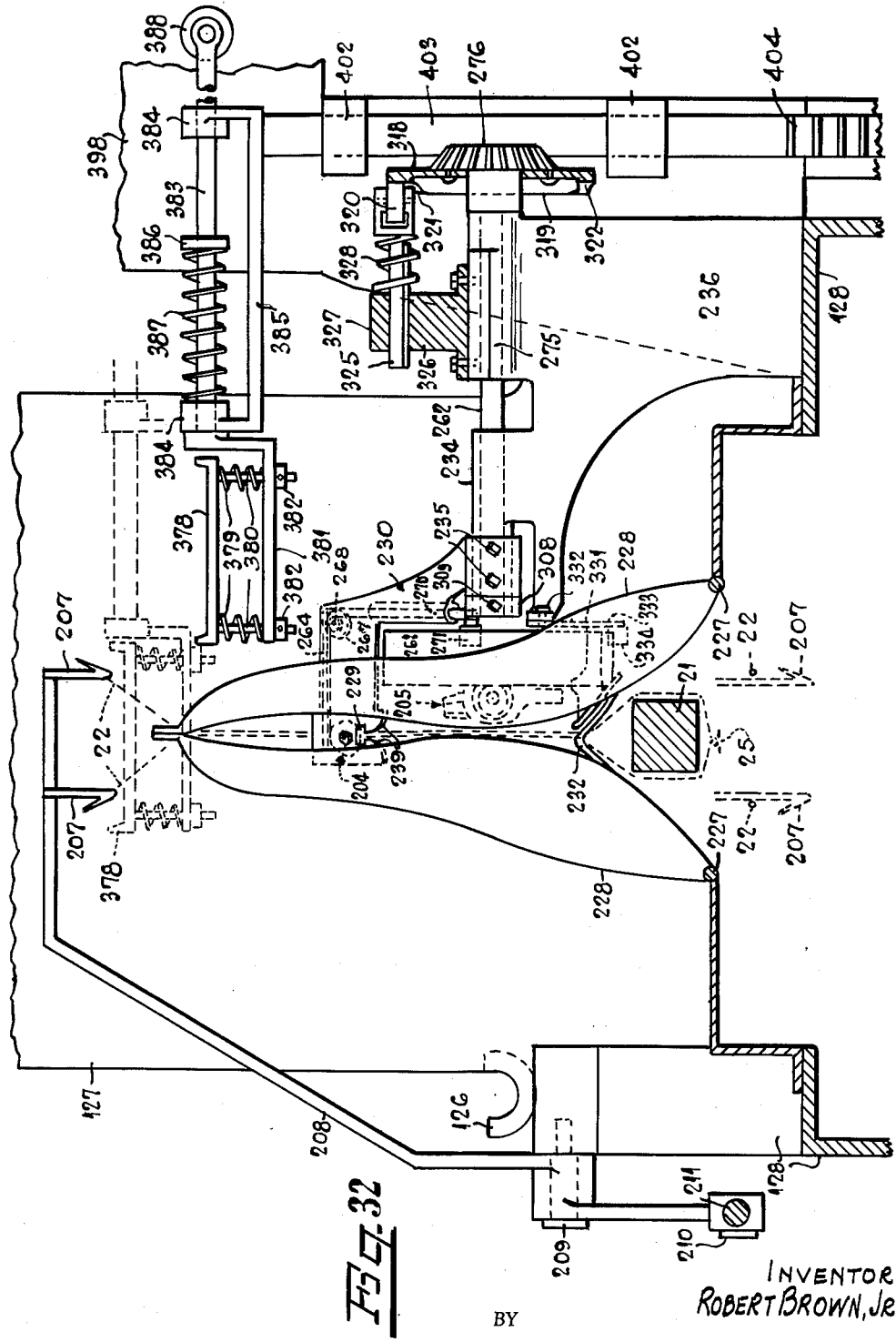

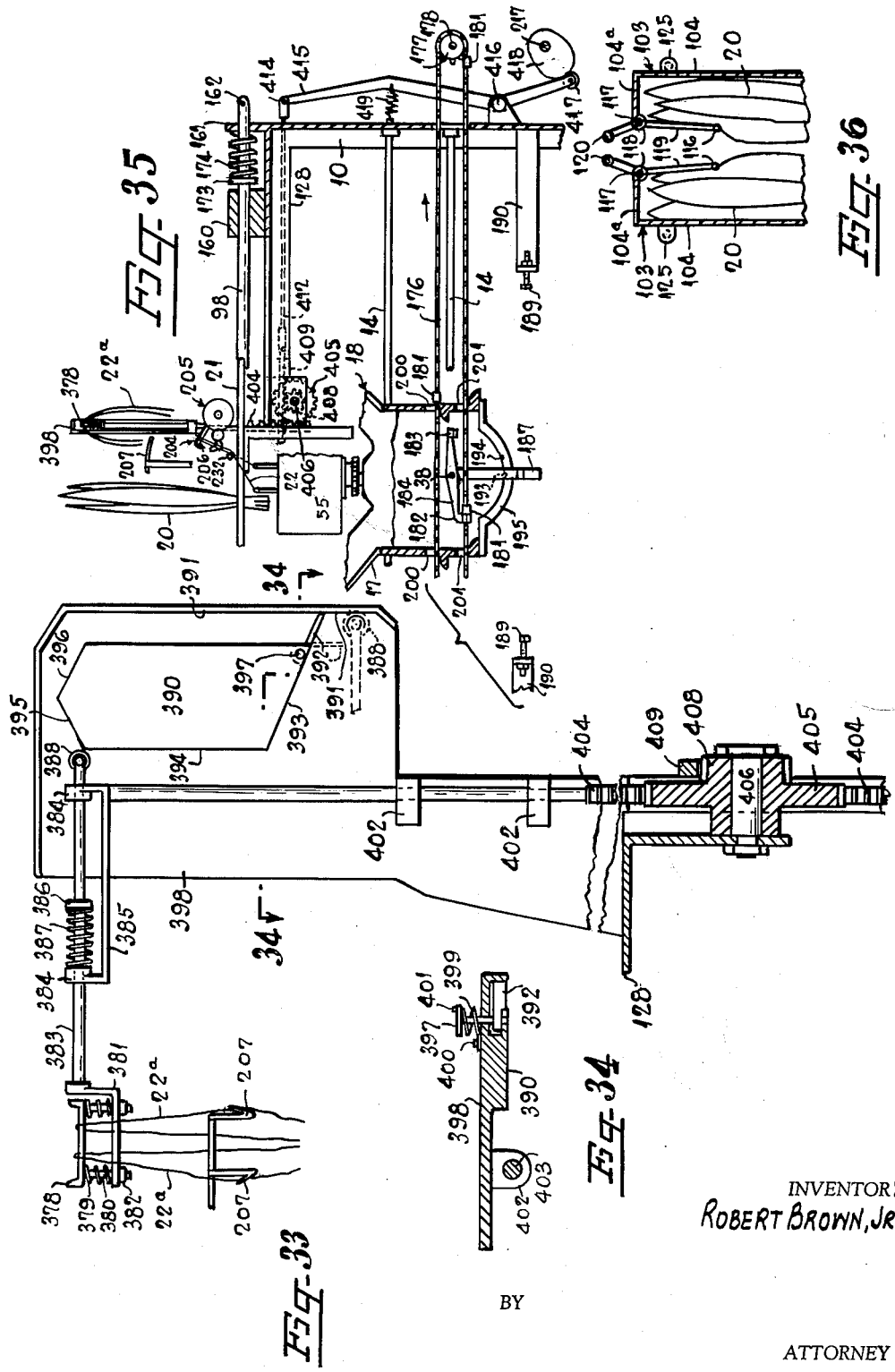

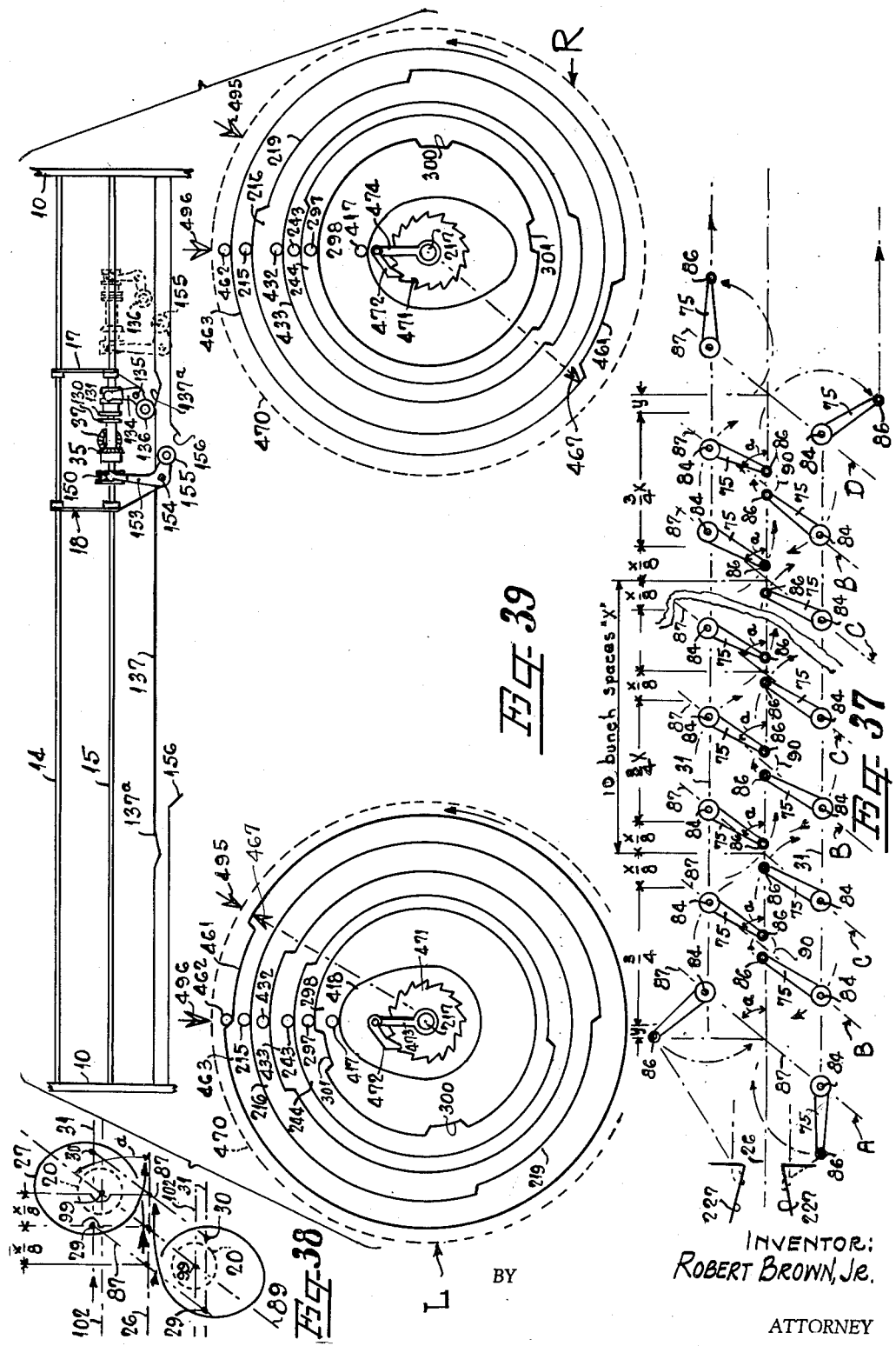

March 31, 1964  R. BROWN, JR  3,127,028
APPARATUS FOR STRINGING TOBACCO LEAVES AND THE LIKE
Filed July 13, 1959  12 Sheets-Sheet 12

INVENTOR:
ROBERT BROWN, JR.

ATTORNEY

United States Patent Office 3,127,028
Patented Mar. 31, 1964

1

3,127,028
APPARATUS FOR STRINGING TOBACCO
LEAVES AND THE LIKE
Robert Brown, Jr., Arlington, Va.
(6712 Wilkins Drive, Falls Church, Va.)
Filed July 13, 1959, Ser. No. 826,549
21 Claims. (Cl. 214—5.5)

This invention relates to the art of looping and knotting and more particularly to a method and means for suspending with strand material, hands or bunches of tobacco leaves or similar leaf material upon an elongated holder to facilitate handling in further operations such as transportation, curing, and stripping.

Heretofore in the stringing or looping of tobacco leaves, either by hand or by mechanical devices, the bunch assembling and bunch looping and interlooping operations have been generally conducted in timed relation to one another, and therefore were interdependent. In conventional methods and devices, the bunches are supplied successively to a looper, which in turn, successively suspends them upon a holder or stick by means of strand material. Where the bunches are continuously supplied or handed to the looper, the interdependency of the operations often results in inefficiency and loss of time, due to the inability of the looper to handle the output of the bunch handers, and conversely. Further, loss of time occurs at the beginning and at the end of looping and interlooping operations where two time intervals respectively are consumed by the looper in securing the strand material to the stick while the bunch supplying operation remains idle.

It is an object of this invention to provide an improved method of suspending upon a stick a plurality of hands or bunches of tobacco leaves or similar material, which comprises the steps of first, assembling in predetermined positions on opposite sides of the stick all of the bunches to be suspended thereon, and then forming interconnecting loops of strand material about and between the opposed bunches, thus causing a portion of the interconnecting strand material to abridge the supporting stick. By first assembling all of the bunches in their correct positions adjacent the stick, the looping operations can proceed while the bunch handers assemble bunches to be positioned adjacent succeeding sticks.

It is another object of this invention to provide an apparatus of the class described in which means are provided for maintaining longitudinally spaced bunches of leaves respectively on opposite sides of a stick and in predetermined relative positions, in combination with a device for forming loops of strand material about the oppositely disposed bunches, said opposed loops being connected by those portions of the strand material which abridge the stick.

It is another object of this invention to provide in an apparatus for looping bunches upon a stick, the further improvement of means operable at the beginning and at the end of the loop forming operations for securing the strand material about the stick.

It is yet another object of this invention to provide an apparatus of the class described, which comprises a looping device alternately movable in opposite directions and capable, during each directional movement, of looping strand material about and between spaced bunches assembled on opposite sides of a stick. This two-way operation of the apparatus makes it possible to continuously loop successive sets of bunches on respective sticks.

Some of the objects of the invention having been stated, other objects will appear as the description proceeds when taken in connection with the accompanying drawings, in which:

2

FIGURE 1 is an isometric view illustrating a stick, and the strand loops and knots formed in connection therewith by the apparatus disclosed herein during suspension of a set of bunches upon, and the tying of the strand material about, the stick;

FIGURE 2 is an enlarged plan view, with its central portion broken away, showing the loops and knots substantially as formed on the apparatus when the directional movement of the looper is from left to right;

FIGURE 3 is a fragmentary side elevation of one end of a stick with a series of suspended bunches thereon;

FIGURE 4 is a view similar to FIGURE 3, showing a slight modification of stick which may be employed;

FIGURE 5 is a plan view of the improved apparatus for looping and securing tobacco leaves to a stick in a manner illustrated in the preceding figures;

FIGURE 6 is a side elevation of FIGURE 5;

FIGURE 7 is a schematic longitudinal sectional view through FIGURES 5 and 6, with the central portion thereof omitted, and showing in dotted lines the longitudinally movable looping device respectively at its two extreme end positions;

FIGURE 8 is an enlarged sectional plan view, with portions broken away, taken along line 8—8 in FIGURE 6, and showing the principal clutches;

FIGURE 9 is a sectional detail view taken along line 9—9 in FIGURE 8;

FIGURE 10 is an elevational view looking at the righthand ends of FIGURES 5, 6 and 8;

FIGURE 11 is a sectional detail view taken along lines 11—11 in FIGURES 10 and 13, and showing the ratchet connection between the cam shafts 217 and the associated train of reduction gears 440, 442, 443, 444, 445 and 446;

FIGURE 12 is an enlarged sectional detail view of the two-piece arm 453 and 456 in FIGURES 10 and 13 employed for operating the cam shaft control clutch 447;

FIGURE 13 is an elevational view looking at the lefthand ends of FIGURES 5, 6 and 8;

FIGURE 14 is a sectional plan view taken along line 14—14 in FIGURE 6 and showing the mechanism employed for supporting spaced rows of bunches of tobacco leaves or the like adjacent opposite sides of a stick during strand looping, interlooping and knotting operations;

FIGURE 15 is a sectional plan view, with portions broken away, and taken along line 15—15 in FIGURE 6;

FIGURE 15A is an enlarged detail view of the upper right-hand portion of FIGURE 4 but showing the loop tightening mechanism is extended position;

FIGURE 16 is an enlarged vertical transverse sectional view through the looping and bunch supporting apparatus, and taken along line 16—16 in FIGURES 6 and 14;

FIGURE 17 is a sectional detail view taken along line 17—17 in FIGURE 16;

FIGURE 18 is a sectional detail view taken along line 18—18 in FIGURE 17;

FIGURE 19 is a sectional detail view taken along line 19—19 in FIGURE 16;

FIGURE 20 is an enlarged longitudinal sectional detail view illustrating the relative positions of the strand knotter bill 231, strand deflector 207, strand tensioner and stripper 378, supporting stick 21, and the strand material 22, as the looping apparatus approaches either of its extreme outermost positions at the ends of a cycle of operations;

FIGURE 20A is a view showing the position of the cam wheel 261 for operating the clamp, cutter and knotter mechanisms immediately preceding the formation of knot 23 at the beginning of looping and interlooping operations upon a stick;

FIGURE 21 is a detail view showing the position of the knotter cam wheel 261 in slightly advanced position from that shown in FIGURE 20;

FIGURE 22 is a detail view showing the knotter cam wheel further advanced and with the knotter bill 231 initially engaging the strand material;

FIGURE 23 is a detail view showing the cam wheel and the knotter bill rotated to a still further position, and with the strand material looped around the bill;

FIGURE 24 is a detail view showing the knotter bill as the knot is completed, and with the stripper foot 330 operating to remove the knot from the bill;

FIGURE 25 is a sectional detail view taken along line 25—25 in FIGURE 22;

FIGURE 26 is an enlarged sectional detail view taken along line 26—26 in FIGURE 20, and showing the strand clamp mechanism 204 and the cutter mechanism 206 in position to receive the strands 22 at the termination of looping and interlooping operations;

FIGURE 27 is a sectional detail view taken along line 27—27 in FIGURE 26;

FIGURE 28 is a detail view similar to the left-hand portion of FIGURE 26, but showing the parts in the positions occupied immediately following the knotting of the strands at the termination of the looping and interlooping operations, these parts also being in position for receiving and clamping the strands preparatory to knotting at the beginning of the succeeding looping and interlooping operations;

FIGURE 29 is a detail view similar to FIGURE 28, but showing the clamp and cutter parts in the positions occupied after the knot at the termination of looping and interlooping operations has been tied and stripped as shown in FIGURE 24, said parts clamping the ends of the strands emanating from the strand supply until the knot at the beginning of the succeeding looping and interlooping operations has been substantially tied;

FIGURE 30 is a view similar to FIGURE 29, but showing other positions of the clamp and cutter mechanisms;

FIGURE 31 is an enlarged detail view of the cam dog 346 which forms a part of cutters 337 and 338;

FIGURE 32 is an enlarged transverse sectional view taken along the lines 32—32 in FIGURE 5;

FIGURE 33 is a transverse sectional detail view taken along lines 33—33 in FIGURE 5, showing the strand tensioning and stripping mechanism;

FIGURE 34 is a sectional detail view taken along line 34—34 in FIGURE 33;

FIGURE 35 is a longitudinal sectional detail view taken along line 35—35 in FIGURE 5;

FIGURE 36 is a transverse sectional detail view taken along lines 36—36 in FIGURES 5 and 6;

FIGURE 37 is a schematic diagram illustrating the various movements of the looper parts during left-to-right looping and knotting operations in FIGURES 5 and 6;

FIGURE 38 is a schematic diagram showing the path travelled by the outlets 86 of the looper arms 75 during one complete revolution of said arms to encircle two oppositely disposed bunches with strands;

FIGURE 39 is a diagrammatic view showing the relative positions of the cams on the right and left-hand cam shafts 217 when the looping apparatus 18 occupies the position shown in FIGURE 6;

FIGURE 40 is an enlarged schematic plan view similar to a portion of FIGURE 15, showing the position of the strand material immediately after the looper 18 has reached its extreme right-hand position;

FIGURE 41 is a timing diagram showing the sequence of operation of various parts during left-to-right and right-to-left looping and knotting operations in FIGURE 6.

At the outset it should be noted that the herein disclosed apparatus for looping and knotting bunches of tobacco or the like upon a stick comprises a looper movable alternately in opposite directions to loop bunches on successive sticks or holders and a set of controls operable in timed relation to each said directional movement to cause: (a) the strand material to be looped and knotted around the stick at the beginning of the bunch looping operation, (b) the looper to loop the assembled bunches across the stick, (c) the termination of the looping operation when a predetermined number of assembled bunches has been looped, (d) the strand material to be secured around the stick and knotted upon the termination of the looping operation, and (e) the clamping of the ends of the strand emanating from the strand supply, and then repeating the above steps (a) through (d) as the looper moves in the opposite direction. It should also be noted that the set of controls for each looping and knotting operation is located partly at the left unit L and partly at the right unit R of the apparatus (FIGURES 5, 6 and 8) both units being substantially identical, except for changes made necessary to correlate the operations of the respective units. More specifically, during a left-to-right movement of the looper, the controls for knotting and securing the strand material around the left-hand portion of the stick (that is, at the beginning of the looping operation) are located at the left unit L (FIGURES 5, 6 and 8) and the controls for the remainder of the operation on the stick are located at the right unit R. Similarly, during a right-to-left movement of the looper, the controls for knotting and securing the strand material around the right-hand portion of the stick, that is, at the beginning of the succeeding looping operation, are located at the right unit R of the apparatus and the controls for the remainder of the operation on this stick are located at the left unit L.

Since the controls and the controlled devices associated with the respective directional movements of the looper are substantially identical, the same reference characters will be applied to identical parts of the respective controls, unless clarity of disclosure otherwise directs.

The section at the end of the specification, entitled Method of Operation, chronologically describes the principal operations (see FIGURE 41).

Referring more spcifically to the drawings, the numerals 10 designate the left and right end frames respectively, which frames are connected by longitudinal struts 12 and by shafts 14 and 15. A looper carriage 17, with looper 18 mounted thereon, is adapted to slide back and forth upon members 14 and 15. Shaft 15 also serves to drive the looper mechanism hereinafter described.

Looper Mechanism 18

The looper 18 is equipped with mechanism for forming interconnected strand loops 19 about and between the butts of bunches or hands 20 of leaves as the looper moves longitudinally of the apparatus. Bunches 20 usually comprise two or more leaves. Preliminary to the looping operations, the full quota of bunches necessary to fill a stick are positioned in spaces provided on opposite sides of a stick 21 (FIGURES 1 through 6, 14, 16, and 37). For example, in left-to-right looping operations, the interconnected loops 19 are formed with strands 22 in the manner shown in FIGURES 2, 6 and 16, wherein it will be observed that the spaced bunches 20 are positioned with the leaf butts extending downwardly a short distance below and on opposite sides of a horizontally disposed stick 21. At the beginning of the left-to-right cycle of operations, and with apparatus to be later described, a knot 23 is tied in strands 22 above the upper side of the stick 21 (FIGURES 2, 3, 4, 7 and 20), after which the tied strands are drawn downwardly on opposite sides of the stick, and a loop 24 is then formed around the stick by twisting or interlooping the strand portions below the stick as at 25a.

The stick loop 24 having been formed, the bunch looping operations follow which consist of alternately (a) forming loops 19 around a pair of opposed bunches 20, and (b) interlooping the strand portions at 25 or 25a.

Upon the termination of the looping operations and near the opposite end of the stick 21, a second loop 24 is formed around the stick and a knot 23 tied. The ends of the strands 22 are then severed and clamped.

In the drawings (FIGURES 1, 2, 6, 14 and 37) ten bunch spaces "x" are shown between eleven pairs of bunches 20. During the movement of the looper carriage 17 over each distance "x," the strands are interlooped at point 25 or 25a and also a pair of loops 19 are formed about bunches 20. Although FIGURES 2 and 37 show the interlooping at 25 or 25a occurs during a carriage movement of three-fourths "x," and the formation of a pair of loops 19 during a carriage movement of one-fourth "x,", it is evident that these proportions are given for purposes of illustration since substantial variation is permissible to suit conditions of operation.

The looper mechanism is operated by the shaft 15, which mechanism is rotatably mounted in bearings 32 secured to end frames 10 (FIGURE 8). The shaft 15 is provided with a longitudinally extending spline or groove 15a in which a key 33 fits, said key being integral with hub 34 of bevelled gear 35 (FIGURES 8, 9 and 16).

Bevelled gear 35 meshes with bevelled gear 37, fixedly secured on shaft 38 which, in turn, is rotatably mounted in bearings 39 and 40 on carriage 17. A bearing 41 (FIGURES 8 and 9) extends from carriage 17 and has shaft 15 rotatably journalled therein adjacent bevelled gear 35 so that the bevelled gears 35 and 37 will remain enmeshed as the carriage moves back and forth along shafts 14 and 15.

A description follows of the mechanism for alternately interlooping the strands 22 as at 25 and then simultaneously forming two loops 19 around the butts of the tobacco bunches 20. This mechanism comprises bevelled gear 43 (FIGURE 16) fixedly mounted on shaft 38 and meshing with a bevelled gear 44, fixedly mounted on shaft 45, which shaft is disposed vertically and at right angles to shaft 38. Shaft 45 is rotatably mounted in looper carriage 17 and has spur gear 46 fixedly mounted on the upper end thereof, said spur gear meshing with spur gear 47 rotatably mounted on vertically disposed shaft 48. Shaft 48 is rotatably mounted in frame 17 by suitable means such as spaced ball bearings 49.

The flanged hub 47a of spur gear 47 is secured to cylindrical housing 55 by screws 56, said housing having secured to its inner periphery as at 58 an internal bevelled gear 57. A pinion 59 meshes with internal gear 57, and this pinion is fixedly secured as at 60 to a hub 61 of a bevelled gear 62, said hub 61 being rotatably mounted in lateral extension 63 of bracket 64 by suitable means such as ball bearing 65. Bevelled gear 62 meshes with a companion bevelled gear 66, which gear 66 has hub 67 integral therewith and rotatably mounted in lateral extension 68 of bracket 64 by suitable means such as a roller bearing 69. Hub 67 is confined in extension 68 by a collar 70 secured on the projecting lower end thereof. It will be observed in FIGURE 16 that internal gear 57, pinion 59, and gears 62 and 66 constitute an epicyclic train.

Each of the intermeshing gears 62 and 68 has an L-shaped strand guide arm 75 secured to the upper surface thereof by means such as screws 76. It will be observed in FIGURE 16 that the convergent axes of rotation of the intermeshing gears 62 and 68 and of the associated strand guide arms 75 causes the respective strands 22 to be wound around the butts of bunches 20 in planes forming a dihedral angle therebetween, and acute angles with the horizontal, respectively. This angularity of strand feed, coupled with normal tension in the respective strands, serves to cause those portions of the strands, which contact the proximate peripheries of the bunches 20 at the beginning of the formation of a pair of loops 19, to be elevated slightly as the arms 75 continue to encircle the bunches; and upon completion of a revolution of the arms 75, the upper ends thereof will pass beneath that portion of the strands which initially contacted the bunches at the beginning of the loop formation.

The bracket 64 has secured to the lower end thereof as at 76, a pair of laterally extending arms 77, each of which is provided with a pin 78 at its outer end, and upon which a package of strand material 79 may be placed. Each of the strands 22 (FIGURE 16), as it unwinds from a package 79, is drawn upwardly, between a pair of tension disks 80 mounted on a pin 81, said pin extending laterally from bracket 64. The outer end of pin 81 has nut 82 threadably secured thereon. A spring 83 is mounted around pin 81 and disposed between nut 82 and a disk 80. By turning nut 82, the pressure on spring 83 and between the disks 80 may be varied which, in turn, will vary the tension in strand 22.

From the tension disks 80, the strands 22 are drawn upwardly through bores 84 concentrically disposed in hubs 61 and 67 respectively, and then through grooves 85 to outlets 86 in arms 75.

It is thus seen that as shaft 15 and bevelled gear 35 rotate, that continuous rotation will be imparted to housing 55 and internal gear 57 through the driving connection designated by reference numerals 37, 38, and 43 through 47; and when the bracket 64 and its extensions 63 and 68 are secured against rotation, as will be the case at intervals when the loops 19 are formed, the rotation of housing 55 and gear 57 will operate the intermediate driving connection designated by numerals 59, 61, 62 and 66 to cause arms 75 to rotate about their respective axes in opposite directions, thereby simultaneously forming a pair of loops 19 around positioned bunches 20. Stated differently, the relative rotation between housing 55 and the concentrically mounted bracket 64 causes the arms 75 to form the loops 19.

In FIGURE 38, the numerals 27 designate the paths followed by the two strand arm outlets 86 as the arms simultaneously encircle a pair of bunches 20 during the longitudinal movement of looper 18 over the distance one-fourth "x." During the latter movement, the rotational axes or hubs 61 and 67 of arms 75 move longitudinally from points 29 to points 30 along their respective paths.

A ball bearing 88 is disposed between hub 64 and the hub of spur gear 47 to facilitate relative rotation.

The formation of loops 19 is followed by the alternate operation of interlooping strands 22 as at 25 during the continued movement of carriage 17 over a distance of three-fourths "x." This latter operation necessitates the elimination of the above-mentioned relative rotation between housing 55 and bracket 64; and when this is done, both of the members 55 and 64 rotate in unison for one complete revolution. During this unitary rotation, the upstanding legs of arms 75 remain closely adjacent each other in the positions "B" in FIGURE 37 and the arm outlets 86 describe a circle 90 (FIGURE 37). Thus, the strands 22 are interlooped as at 25 (FIGURE 2). Stated differently, the strand guides 75 rotate in adjacent circular paths during the formation of a pair of loops 19, after which the two strands and the guides are fixed against rotation about the individual guide axes while bodily rotation is imparted to these guides about an axis intermediate the guide axes.

Relative rotation is eliminated during the interlooping at point 25, by providing means for rotating shaft 48 at the same rate that housing 55 is rotated by members 38, 43, 44, 45, 46 and 47 (FIGURE 16). To effect this result, a gear 91 is fixedly secured upon shaft 48 at a point immediately below the lower bearing 49, said gear 91 meshing with a smaller gear 92 rotatably mounted upon shaft 45. Gear 92 has integral therewith a larger gear 93 which meshes with smaller gear 94 rotatably mounted on shaft 48. Integral with gear 94, is bevelled gear 95 which is adapted to mesh with bevelled gear segment 96 on disk 97 (FIGURES 16, 17, 18 and 19) during the period of unitary rotation of housing 55 and bracket 64 as looper carriage 18 moves over a distance of three-fourths "x." Thus, through the gear segment 96, bevelled gear 95, and the series of reducing gears 91, 92 and 93, the bracket 64 and housing 55 may be rotated by a common drive shaft 38 at the same rate and in the same direction thereby eliminating relative rotation between gears 57 and 59 during the interlooping operations at points 25.

As previously stated, after each interlooping operation at a point 25 or 25a, relative rotation is effected between the members 55 and 64 to cause each of the arms 75 to revolve exactly one revolution and form a loop 19. This relative rotation is controlled by a flat untoothed segment 100 on disk 97 (FIGURES 17 and 18). The flat surface of segment 100 engages another flat surface 101, on the hub which connects gears 94 and 95, immediately after the bevelled gear 95 becomes unmeshed with toothed segment 96. During the rotation of shaft 38 and disk 97 while said flat surfaces 100 and 101 are engaging one another, the driving connection between disk 97 and bracket 64, that is, members 94, 93, 92, 91 and 48, will remain stationary and thereby cause the bevelled internal gear 57 to rotate bevelled gear 59. The rotation of gear 59 will, in turn, rotate the strand guide arms 75 exactly one revolution to form loops 19. During the simultaneous formation of loops 19, the axes of rotation of hubs 61 and 67 about which arms 75 are rotating, remain in fixed angular position relative to shaft 48 as the looper 18 moves longitudinally of the apparatus (FIGURES 37 and 38). Stated differently, the centerline 87 passing through the axes of rotation of hubs 61 and 67 remains at an angle "a" with centerline 26 during said movement of the looper over a distance of one-fourth "x" (FIGURES 37, 38 and 40).

It will be noted by referring to FIGURES 14 and 38 that the lines 89 passing through the centers of successive pairs of bunch holder loops 111 and 115 are also disposed at angle "a" with respect to centerline 26 of stick 21, thereby providing staggered bunches on opposite sides of the stick. In designing an apparatus of this type, it is evident that angle "a" may vary from 90 degrees, where the oppositely positioned bunches would not be staggered, to an angle of approximately 45 degrees affording maximum stagger. The bunch holding mechanism will be described subsequently in greater detail.

The carriage 17 has extending upwardly therefrom a pair of blade separators 110, said separators being adapted to pass between the butts of bunches 20 in advance of the looping to clear a path for rotating arms 75 (FIGURES 6, 7, 15, 16 and 40).

*Bunch Spacing Apparatus 103*

A framework is provided for holding all of the bunches 20 to be suspended upon a stick 21 in predetermined positions during the above-described looping operations. In such positions the arms 75 will successively encircle each pair of bunches with optimum clearance and in a manner shown in FIGURE 38. The moving parts which rotate arms 75 to form bunch loops 19 are lighter than the moving parts which rotate housing 55 to interloop the strands 22 as at 25 and 25a. Accordingly for purposes of illustration, the arms 75 are described as rotating one revolution during the travel of looper 18 over a distance one-fourth "x," whereas the unitary rotation of housing 55 to form loops at 25 and 25a is effected during a travel of three-fourths "x."

In preparation for the stick and bunch looping operations, a stick 21 is positioned between the proximate ends of the alined spring-pressed rods 98. The bunches 20 are then positioned on opposite sides of the stick at the points 99 (FIGURES 14 and 38), the bunches on each side being supported by a suitable rack or frame.

The bunch supporting means referred to above comprises a pair of frames 103, each designed to removably support adjacent a stick 21, one-half of the bunches 20 necessary to fill the stick. Each frame 103 is constructed from suitable material such as a plate 104 (FIGURES 14, 16 and 36) which has secured to the lower inner edge thereof a longitudinally disposed bar 105. Slidably penetrating plate 104 and bar 105 are a plurality of bolts 106. One bolt 106 is provided at each bunch position except at the end bunch position, and the inner ends of these bolts are secured as at 107 to a flexible band 108, preferably made of spring steel, said band having its ends secured to bar 105 as at 109. Band 108 also has spaced loops 111 formed therein, substantially concentric with bundle centers 99, which loops are adapted to receive the butts of the bunches. Each loop 111 has an open side 112 adapted to permit insertion or removal of a bunch 20 before and after the looping operations, respectively. Between adjacent bunch loops, the band 108 has alined straight portions 113 adapted to press against stick 21 to cause the intermediate open sides 112 of the loops 111 to be closed by the stick and thereby confine the butts of bunches 20 within the loops. A spring 114 is disposed around slidable bolt 106. The ends of each spring 114 respectively abut the bar 105 and a loop 111, so that loops 111 and straight portions 113 of flexible band 108 will yieldably conform to permissible deviations of the stick 21 from a straight line.

Mounted at each end of frame 103 (FIGURE 15A) and alined with loops 111, is a rotatable holder 115 for an end bunch 20. These holders are designed to roll the four end bunches toward the ends of the stick after completion of the looping and knotting operations, thereby tightening the loops 24 around the stick and also removing any undesirable strand slack between the bunches. This apparatus will be described later in detail.

In order to gently confine the tip ends of the bunch leaves within the frame 103, while the butts of the bunches are held in holder loops 111 and 115 (FIGURES 5, 6 and 36), a rod 116 is swingably supported for movement about a second rod 117, the latter rod being journalled in bearings 118 of laterally extending portions 104a of plate 104. Rods 116 and 117 are connected by vertically disposed rods 119.

The upper central portion of pivot rod 117 has integral therewith a handle 120 which may be used to carry the frame 103 and its contents, either alone or together with another frame 103 as shown in FIGURE 36.

Each of the frames 103 has fixed handles 121 which may also be employed to manually support the frame 103 and contents. A pair of hubs 125 extends longitudinally from each end of the frame 103 (FIGURES 5, 6 and 14), and these hubs are adapted to removably fit in notched lugs 126 of spaced upstanding brackets 127 to thereby support the spaced bunches 20 in looping positions. The bunch frames 103 on opposite sides of the stick 21 are identical and interchangeable. To shift a frame 103 from installed position on one side of the stick to the other, it is only necessary to lift the frame from its supporting lugs 126, rotate it 180 degrees, and then install it in lugs 126 on the opposite side of the stick.

The upstanding brackets 127 are respectively mounted upon cantilevered portions 128 extending inwardly from the proximate upper portions of end frames 10. Brackets 127 are spaced so as to provide a close supporting fit for the removable frames 103.

*Looper Arm Brake 130, 131*

In a left-to-right movement of looper 18, and after the required number of alternate looping operations at 19, 25 and 25a have been performed, that is, after the formation of eleven pairs of loops 19 and twelve strand interloops 25 and 25a, it is necessary to releasably latch the arms 75 in the positions shown at D (FIGURE 37) preparatory to knotting the strands 22 as at 23 to form loop 24 around the stick 21 (FIGURES 1, 2 and 3). In a right-to-left movement of looper 18, the arms 75 are releasably latched in a similar position A upon completion of the looping operations at 19, 25 and 25a on the succeeding stick.

When the looper 18 and arms 75 reach either of the positions A or D, a roller 243 rides upon the high side of a cam 244 (FIGURES 8, 10, 13 and 39) to disconnect a clutch in the driving connection for shaft 15. During the left-to-right looping operations between positions A and D, the clutch element 240 controlling the looper 18 and its drive shaft 15, is in turn controlled by the cam shaft 217 of unit L (FIGURE 41). In right-to-left looping operations a similar clutch element 240 is controlled by the cam shaft 217 of unit R. These elements will be described later in detail.

As the looper 18 approaches either of the positions A or D (FIGURES 2, 6, 8, 9, 37 and 39), suitable braking mechanism is employed to retard the momentum of the looper and the associated elements operating the strand arms 75. The braking mechanism is designed to retard, without stopping, these moving elements so that the arms 75 will not overrun the latched positions A or D. The braking mechanism comprises a friction disk 130 (FIGURE 9) mounted on the hub 34 of bevelled gear 35. Gear 35 is installed in the driving connection for arms 75, and by braking this disk the momentum of the moving parts will be so reduced that cavities 141 or 142 (FIGURE 19), when engaged by roller 140 will releasably hold the arms in positions A or D.

Disk 130 is positioned opposite a second friction disk 131, the latter disk being slidably mounted on shaft 15 by means of yoke 132 pivoted as at 133 to the hub of disk 131. The yoke 132 is integral with the upper end of a bell crank 134 pivoted as at 135 to carriage 17, said bell crank having a roller 136 on the free end thereof adapted to engage cam surface 137 extending parallel to the line of travel of the carriage. Spring 138 surrounds shaft 15, and is disposed between carriage frame 17 and the hub of friction disk 131 to normally press disk 131 toward disk 130. The relative positions of the two friction disks are controlled by roller 136 which engages cam surfaces 137 and 137a.

It will be noted by referring to FIGURE 9 that a slight clearance 131a is provided between the shaft 15 and the hub of disk 131 to prevent binding during the slight arcuate travel of disk 131 about pivot 135 (FIGURE 6).

Immediately before the arms 75 occupy positions A or D, the roller 136 moves into a slight depression 137a in cam surface 137, thereby causing disks 130 and 131 to become engaged and to retard without stopping the momentum of the parts which drive arms 75.

*Latching Mechanism 140, 141, 142 for Strand Guide Arms 75*

During the latter part of the above-described braking action, or soon thereafter, a mechanism is brought into action to releasably latch the arms 75 in fixed positions A or D. In order to so latch arms 75 at the termination of looping and interlooping operations for successive sticks, a suitable spring-pressed detent or roller 140 is provided (FIGURES 8, 16, 18 and 19), which roller is caused to releasably engage a cavity 141 or 142 in disk 97. At the termination of the left-to-right looping operations, the roller is caused to releasably engage cavity or detent 141 in disk 97 to hold the arms 75 in position D. Similarly, at the termination of right-to-left bunch looping operations, the roller 140 engages cavity or detent 142 to hold the arms 75 in position A. When the arms 75 are unlatched, the roller 140 presses against the flat face of disk 97 as shown in bold lines in FIGURE 19. The circular path of engagement of roller 140 with disk 97, corresponding to said unlatched position of arms 75, is devoid of cavities. When, however, the arms 75 approach either the positions A or D, the roller 140 is moved to dotted line position in FIGURE 19 where it will enter the selected cavity 141 or 142 to releasably latch the arms 75 in position.

Roller 140 is mounted in one leg of L-shaped bracket 143 (FIGURES 8 and 16), the other leg of said bracket being slidably mounted upon bolts 144, said bolts lying in a plane passing through shaft 38 and extending from one leg of another bracket 145. Springs 146 on bolts 144, yieldably press bracket 143 and roller 140 toward disk 97 at all times. The other leg of bracket 145 is slidably mounted upon rotatable shaft 15 and is secured against rotation thereon by means of pin 147 extending from said bracket in a direction parallel to shaft 15. The outer end of pin 147 is slidably mounted in carriage frame 17. A spring 148 is mounted around shaft 15 between the frame 17 and bracket 145 to thereby normally force the latter bracket, as well as the associated bracket 143, bolts 144, springs 146 and roller 140, toward shaft 38. In the position shown in FIGURES 8 and 19, the roller 140 travels upon a circular level path on the face of disk 97, and hence the arms 75 and operating parts therefor remain in unlatched position. When roller 140 is shifted radially outwardly (FIGURE 19) to dotted line position, rotation of the disk will cause the roller to engage one of the notches 141 or 142 to latch the arms 75 as stated above.

Bracket 145 has groove 150 in its hub positioned around shaft 15 (FIGURES 8, 9 and 39), said groove being adapted to receive pins 151 of yoke 152. The yoke is integral with the upper leg of a bell crank 153, the latter member being pivoted as at 154 to the looper carriage 17. A roller 155 is mounted on the lower leg of bell crank 153 and adapted to contact cam surface 156 which, in turn, will move members 145, 146 and 143 to the left (FIGURE 8) to position roller 140 in the path of one of the cavities 141 and 142 to latch the arms 75 in position A or D.

*Stick Clamp Mechanism 98*

As previously stated, the opposite ends of stick 21 are removably clamped between the ends of supporting rods 98 while the bunches 20 are looped and attached to the stick. The alined rods 98 and the operating structures therefor are substantially identical, and are mounted in left and right units L and R respectively.

Rod 98 is slidably mounted in brackets 160 and 161 on cantilevered frame 128 (FIGURES 5, 6, 10 and 13), the outer end of said rod having a bolt 162 therein slidably fitting in a slot 163 in the upper leg of bell crank 164 pivotally mounted as at 165 to end frame 10. The other leg of bell crank 164 has pivoted thereto as at 166, the upper end of a vertically disposed link 167, said link extending downwardly and having its lower end secured to the free end of lever 168 as at 169. The other end of lever 168 is fixedly secured on shaft 170 mounted for oscillation in spaced brackets 171 on end frame 10. A treadle 172 has one end thereof fixedly secured to shaft 170 with its free end suitably positioned relative to the floor line for foot operation.

In order to cause the inner end of rod 98 to be normally pressed inwardly, or against the end of an inserted stick 21, a collar 173 is fixedly secured upon shaft 98 adjacent bracket 160; and mounted upon rod 98 between collar 173 and bracket 161 is a spring 174. When in extended position, the spring 174 forces the collar against bracket 160 if a stick 21 is not clamped between the inner ends of the rods. By exerting foot pressure upon one of the treadles 172 the inner end of the associated rod 98 may be moved outwardly to permit removal or insertion of a stick.

*Control for Directional Movement of Looper 18*

During each complete operation of suspending and attaching the required bunches 20 to a stick 21, the carriage 17 of looper 18 is moved from one extreme dotted line position in FIGURE 7 to the other. It will be observed that these extreme positions are located outwardly a substantial distance from the points where the bunch looping operations begin and end. These extra outward movements of carriage 17 are required to provide the necessary strand length for manipulation by the clamp, cutter and knotter structure in the formation of loops 24 around the stick 21.

The carriage 17 and looper 18 are alternately propelled back and forth along rods or shafts 14 and 15 by suitable means such as sprocket chain 176 (FIGURES 8, 16 and 35) mounted on sprockets 177 secured upon shafts 178. At left unit L and at right unit R a shaft 178 is rotatably secured in brackets 179 extending from end frames 10. A crank 180 is fixedly secured upon the end of shaft 178 of unit R, said crank being adapted to be rotated in a clockwise direction to shift the looper back and forth.

Looper chain 176 has spaced lugs 181 secured thereto, one of which is adapted to engage an end 182 or 183 of shift arm 184 to move the carriage 17 and looper 18. When the looper is moving from right to left as shown in FIGURE 35, a lug 181 engages the end 182 of the shift arm, said end 182 operating in connection with the lower segment of the chain. In left-to-right movement of the looper, a lug 181 on the upper segment of the chain engages the end 183 of the shift arm.

Shift arm 184 is mounted for oscillation upon rotatable shaft 38. Upon rotation of the arm 184 in a counterclockwise direction in FIGURE 35, the end 183 will be moved into the path of a lug or projection 181, and upon engagement thereof, the looper carriage 17 will be moved from left to right. Conversely, clockwise rotation of the arm will move end 182 into the path of a lug 181 on the lower segment of chain 176 to thereby cause right-to-left movement of the carriage.

It will be observed in FIGURE 16 that shift arm 184 is confined upon shaft 38 between two collars 186. It will also be noted that the ends 182 and 183 are U-shaped and adapted to enclose three sides of the chain 176 when moved into the path of a lug 181. In FIGURE 16 the upper end 183 is shown positioned in the path of a lug 181 on the upper segment of the chain, and at this time the other end 182 is positioned below the lower segment of the chain out of the path of the lugs. In FIGURE 35 the positions of the ends 182 and 183 relative to the lower and upper segment of the chain are reversed.

The shift arm 184 has integral therewith a downwardly extending arm 187 (FIGURE 16) which, at the extreme right-hand position of the carriage 17 (FIGURES 6 and 8) is adapted to engage adjustable bolt 189 secured in bracket 190 of unit R. Upon engagement of arm 187 with this bolt 189, the shift arm 184 will be rotated clockwise to the position shown in FIGURE 35, thus releasing the U-shaped end 183 from lug 181 on the upper segment of the chain to stop left-to-right movement of the carriage while the chain continues to rotate. Simultaneously with the release of end 183, the end 182 will move into the path of a lug 181 on the lower chain segment, and when this lug engages end 182, the carriage 17 will be moved from right to left. At the extreme left-hand position of carriage 17, arm 187 will contact another bolt 189 to effect stoppage of the carriage.

The upper and lower segments of chain 176 pass through openings 200 and 201 respectively in the carriage 17 (FIGURES 8 and 16), said openings serving to guide the chain segments and its lugs 181 along paths suitable for engagement by the shift arm ends 182 and 183.

The shift arm 184 is releasably held in the two above-described positions by means of a spring-pressed plunger 192 (FIGURES 16 and 35), said plunger having its lower end engageable with cavities 193 and 194 in arcuate segment 195. Segment 195 is secured to the lower portion of carriage 17. Plunger 192 is slidably mounted in spaced lugs 196 integral with arm 187. A spring 197 is confined around the plunger 192 between upper lug 196 and a collar 198 on the plunger. Plunger 192 releasably engages cavities 193 and 194 when ends 182 and 183 are respectively positioned in operative relationship with the lower and upper segments of chain 176.

When the shift arm 184 is actuated as a result of contact between members 187 and 189, one of the ends 182 or 183 is released from engagement with a lug 181, and simultaneously the other shift arm end is moved into operative relationship with the opposite chain segment. The lugs 181, however, are so spaced upon chain 176, that when one lug 181 is released, the chain will travel a short distance before another lug 181 engages the opposite end of the shift arm. During this interim between lug engagements the carriage 17 will remain stationary. Also, during this interim, the loop 24 is formed about stick 21 at the end of a cycle of looping and interlooping operations.

The carriage 17 and associated parts move in a horizontal rectilinear path in timed relation to the rotation of strand guides 75, as well as in timed relation to the related controls and driving mechanisms. The sprocket chain 176, which shifts the looper 18 back and forth, is driven by two substantially identical mechanisms shown in FIGURES 8, 10, 13 and 39, one mechanism being located in unit L and the other in unit R. It is there seen that the hub of sprocket 177 has a clutch face integral therewith which is engageable with another clutch face on element 426, said element being slidably keyed upon shaft 178 and having a peripheral groove 427 therein in which pins 428 of yoke 429 fit. Yoke 429 is integral with the upper end of a lever 430, pivoted as at 431 to end frame 10. The lower end of lever 430 has a roller 432 thereon which engages a cam 433 fixed on cam shaft 217. A tension spring 434 tends to yieldingly urge roller 432 into engagement with cam 433 at all times. At a time to be later described, the roller 432 rides upon the high side of cam 433 to disconnect the carriage 17 and shift chain 176 from the driving source.

As heretofore stated, the arms 75 are driven by splined shaft 15 (FIGURES 8 and 16), which shaft has bevelled gears 202 on opposite ends thereof. Bevelled gears 202 mesh with gears 203 rotatably mounted on drive shafts 178 of units L and R respectively. The hub of gear 203 has a clutch face engageable with another clutch face on clutch element 240, said element being slidably keyed on shaft 178 and having a peripheral groove 240a therein in which pins 241a of yoke 241 are adapted to fit (FIGURES 8, 10 and 13). Yoke 241 is integral with the upper end of lever 242 pivoted intermediate its ends as at 242a to end frame 10. The lower end of lever 242 has roller 243 thereon which engages cam 244 on cam shaft 217. A tension spring 244a yieldingly urges the roller into engagement with cam 244 at all times. The shape of cam 244 is more clearly shown in FIGURE 39.

When chain 176 moves looper 18 a distance of one-fourth "x" (FIGURE 37), the shaft 15 will rotate arms 75 each one full revolution about its axis of rotation as illustrated by the arrows in the positions C; and then with these arms latched against individual rotation, bodily rotation of 360 degrees will be imparted to the arms along with the housing 55 as illustrated by positions B during the continued movement of looper 18 over a distance of three-fourths "x."

*Strand Manipulation Preparatory to Tying End Knots 23*

As heretofore described, the arms 75 are releasably latched in fixed positions D upon the termination of the bunch looping and strand interlopping operations. After such latching, the carriage proceeds to its extreme outer position to provide two horizontal lengths of strands 22 between the end interloop 25a and the outlets 86 of arms 75 (FIGURE 40). These horizontally disposed portions of strands 22 are then deflected upwardly and positioned in the clamping mechanism 204 (FIGURES 26 through 30). After clamping, the strand portions will be tied by knotter mechanism 205 (FIGURES 6, 7, 20 through 25 and 35), and then severed by cutter mechanism 206 (FIGURES 26 through 30).

At or about the time arms 75 become latched, a pair of hooks 207 are lowered on opposed sides of stick 21 below the horizontal path of arm outlets 86. Then as the carriage 17 and arms 75 are moved from position D (FIGURE 37) to the extreme right-hand position, the horizontal portions of strands 22 will be disposed above the hooks 207. Subsequently, the hooks 207 of unit R or L will transfer the engaged strands 22 to the clamping mechanism 204, at which time the strands occupy the dotted line positions in FIGURES 6 and 7 or the bold line position in FIGURE 20.

Hooks 207 are integral with the upper leg of bell crank lever 208, pivoted as at 209 to cantilevered portion 128. The lower leg of lever 208 has pivotally secured thereto as at 210, one end of a link 211, said link extending horizontally (FIGURES 6 and 10) and having its other end pivotally secured as at 212 to the upper end of a lever 213. Lever 213 is pivoted intermediate its ends to frame 10 as at 214, and its lower end has roller 215 mounted thereon which engages a cam 216 (FIGURES 13 and 39). Cam 216 is fixedly secured on the cam shaft 217 rotatably mounted in plate brackets 179 secured to frame 10. A spring 218 (FIGURE 6) normally holds roller 215 in engagement with cam 216. When roller 215 is pressed into depression 219 of the cam (FIGURE 39) the hooks 207 are rotated from the bold line elevated positions shown in FIGURES 6, 20 and 32 to the lowered positions in FIGURES 32 and 40 below the horizontal portions of strands 22.

It will be observed by referring to FIGURE 37 that the strand outlets 86 of arms 75, when latched in position D, are located at different distances from the stick centerline 26. This difference varies with the size of the angle "a." For example, where the angle "a" is 90 degrees, the difference of these entrances would be a minimum, whereas as angle "a" increases there is a corresponding increase in the difference. As the carriage 17 of looper 18 moves from position D to the extreme right-hand position (FIGURES 15 and 40), the horizontal portions of strands 22 emanating from the outlets 86, in some instances, must be deflected laterally into the upward path of travel of hooks 207.

This deflecting mechanism comprises arms 221 (FIGURES 6, 7, 15 and 40) fixedly secured on shaft 222 and mounted for oscillation in bunch separator blade 110. Shaft 222 has a downwardly extending arm 223 secured thereon, said arm having on its lower end a roller 224 which is adapted to engage cam 225 at the appropriate time to thereby rotate arm 221 to a vertical position. A torsion spring 226 is mounted upon shaft 222 and is adapted to normally press arm 221 toward horizontal position. The cam 225 is contacted by roller 224 as the looper unit 18 approaches the end of the bunch looping operations, and at a time sufficiently early to properly engage and deflect the strand 22 into the upward path of lowered hooks 207.

Two pairs of deflector arms 221 are provided. The arm 221 at the right of the looper unit 18, operates as the looper unit approaches its extreme left position, and the arm at the left of the unit operates as the unit approaches its extreme right position (FIGURE 7).

During the elevation of strands 22 by hook 207 from the position shown in FIGURE 40 to the positions shown in FIGURES 20 and 32, suitable guiding means are employed to direct these strands into the clamping mechanism 204 where tying the knot and severing of the strands follow. This guiding means comprises oppositely disposed, converging baffle plates 227 and 228 (FIGURES 5 and 32) which guide a portion of strands 22 into notch 229 of clamp and cutter holder 230 (FIGURE 26), and another portion of these strands into V-shaped stop 232, said stop being disposed below the knotter bill 231 and above the stick 21 (FIGURES 14, 20 and 32). The notch 229 and stop 232 are located in such positions above and below knotter bill 231 of knotter unit 205 so as to hold the strands 22 adjacent the bill.

*Strand Clamping Mechanism 204*

The holder 230, which supports the clamping mechanism 204 and the cutter mechanism 206, is adjustably secured around bearing 234 by means such as set screws 235 (FIGURES 26 and 32), said bearing being integral with the upper portion of a bracket 236 mounted upon cantilevered portion 128. The holder 230 is substantially L-shaped and has legs 237 and 238, the latter leg being provided with the V-shaped notch 239 having its apex communicating with the previously described notch 229 in which strands 22 are guided preparatory to clamping, tieing and cutting.

Leg 238 has fixedly mounted therein (FIGURE 27), a shouldered bolt 245 upon which is mounted for oscillation, spaced holder disks 246 and 247, said disks being connected by a common hub 248. The peripheries of these disks have one set of coinciding notches 250 adapted to receive strands 22 for clamping at the termination of the looping and interlooping operations, and another set of coinciding notches 251 adapted to receive the strands 22 for clamping at the beginning of the succeeding looping and interlooping operations.

Associated with notch 250, and positioned in the space between the holder disks 246 and 247, is a holder plate 252, said plate being integral with one end of a leaf spring 253 secured to leg 238 as at 254 (FIGURES 26 and 27). Plate 252 is normally pressed toward hub 248 by leaf spring 253, and serves to hold the strands 22 in the notches 250 as the disks 246 and 247 rotate in a clockwise direction from the position shown in FIGURE 26 to that shown in FIGURE 28 to interlock the strands 22 between the proximate surfaces of the disks and the holder plate.

Notches 251 have a holder plate 256 associated therewith which is also positioned in the space between disks 246 and 247 (FIGURES 26 and 27), said plate being integral with one end of leaf spring 257 secured to leg 238 as at 258. Immediately preceding the beginning of the bunch looping operation, the notches 251 coincide with notch 229 and receive the strands 22 for clamping (FIGURE 28). Subsequently, the disks will be rotated in a counter-clockwise direction from the position shown to thereby clamp the strands. During the clamping, the holder plate 256 cooperates with the disks to hold the strands in the notches 251 and to clamp the strands between the adjoining surfaces of the plate and disks.

Oscillatory motion is imparted to disks 246 and 247 by cam groove 260 (FIGURES 20, 21 and 22) formed in wheel 261, said wheel being fixedly secured upon shaft 262, rotatably mounted in the bearing 234 (FIGURE 26). The connection between the disks and the cam groove comprises toothed segment 263 formed on the periphery of disk 246, which segment meshes with toothed rack 264 slidably mounted in guideways 265 and 266 on leg 238. The connection further comprises toothed rack 264 also meshing with spur gear 267, which gear is integral with a smaller spur gear 268, both of said gears being rotatably mounted as at 269 on holder 230. Finally, gear 268 has meshing therewith one end of a second toothed rack 270, said rack being slidably mounted in leg 237 and having on its other end a roller 271 fitting in the cam groove 260. The above described clamp structure 204 will be operated in a manner to be later described as wheel 261 and shaft 262 rotate intermittently in a clockwise direction in FIGURES 20 through 25.

Shaft 262 is rotatably mounted in alined spaced bearings 234 and 275, which bearings are integral with bracket 236 (FIGURE 32). The end of shaft 262 remote from wheel 261 has fixedly secured thereon a bevelled gear 276. Gear 276 meshes with bevelled gear 277 (FIG- URES 5 and 6) fixed on shaft 278, which shaft is rotatably mounted in bearings 279 and 280. Shaft 278 also has mounted thereon a bevelled gear 281, which meshes with bevelled gear 282 on the upper end of shaft 283 (FIGURES 10 and 13). Shaft 283 is rotatably mounted in bearings 284 and 285 and has fixedly secured on its lower end, a bevelled gear 286 meshing with bevelled gear 287, loosely mounted on shaft 178 (FIGURE 8).

Integral with the hub of bevelled gear 287 is a toothed clutch element 290, said element adapted to be engaged at selected times, by a second toothed clutch element 291 slidably keyed upon shaft 178 as at 292. Element 291 has peripheral groove 293 therein engaged by pins 294 of yoke 295, said yoke being integral with the upper end of lever 296 pivoted as at 296a to end frame 10. The lower end of lever 296 has a roller 297 mounted thereon which is yieldably held in engagement with cam 298, said cam being fixedly secured upon cam shaft 217. Cam 298 has depressions 300 and 301 therein (FIGURE 39) which, when engaged during the rotation of cam shaft 217, will permit clutch elements 290 and 291 to become engaged, and this engagement, in turn, will complete the above-described driving connection between shaft 178 and the cam wheel 261 (FIGURES 5, 6, 26 and 32).

By referring to FIGURES 5 and 6, it will be noted that the bevelled gear 277 is located to the left of bevelled gear 276 in both the left unit L and right unit R. These parts are arranged in this manner so that the cam wheel 261 and shaft 262 at the left unit L will be rotated in a counterclockwise direction in FIGURE 6 and in a clockwise direction at the right unit. In other words, the top peripheries of members 261 and 262 will be caused to rotate outwardly toward the ends of stick 21 in FIGURE 20 which shows identical structure for the units L and R.

*Strand Tying Mechanism 205*

The strand tying or knotting mechanism 205 (FIGURES 20 through 25) is adapted to form the knot 23 in the strands 22 to complete loop 24 (FIGURES 1, 2, 3 and 4) at the beginning and at the end of each cycle of looping and interlooping operations. The knotter or tying mechanism per se is old, and may be one of many conventional knotters such as the one disclosed in the Patent No. 737,246, issued August 25, 1903 to E. A. Johnson wherein the knotter is used in association with grain binder structure. However, the adaptation of this knotter structure to the above-mentioned clamp and cutter mechanism, as well as the use of the knotter in tobacco harvesting in the manner herein disclosed is believed to possess broad novelty.

The knotter bill 231 is rigidly secured on one end of a shaft 305 and projects radially of the longitudinal axis of said shaft (FIGURE 25). Shaft 305 is rotatably mounted in bracket 306, said bracket being forked and having leg 307 thereof supported by the end of rotatable shaft 262. The other leg 308 of bracket 306 is fixedly secured to stationary bearing 234 by means of set screws 309 (FIGURES 25, 26 and 32). A cooperating knotter bill 310 is pivotally mounted in the rigid bill 231 as at 311. One end of pivoted bill 310 cooperates with fixed bill 231 to clamp and release the strands 22 during the formation of knot 23. The other end of bill 310 has a roller 312 mounted thereon, which roller contacts conventional cam surface 313 and cam plate 314 during the rotary motion of the bills and to cause them to assume a number of positions as the knot 23 is formed (FIGURES 20 through 25).

Shaft 305 has bevelled gear 315 fixed thereon, which gear is caused to be rotated by bevelled gear segments 316 and 317 at certain intervals as wheel 261 rotates. During the first half revolution of wheel 261 from the position shown in FIGURE 20, the knot 23 at the termination of the looping and interlooping operations is formed; and during the second half revolution, the knot 23 at the beginning of the succeeding looping and interlooping operations is formed. Stated differently, during the first half revolution the wheel 261 rotates in a clockwise direction from the position shown in FIGURE 20 to that shown in FIGURE 20A; and during the second half revolution the wheel continues rotation until it again assumes the position shown in FIGURE 20.

The first and second knots 23 above, are formed respectively when roller 297 rests in depressions 300 and 301 of cam 298 (FIGURE 39). It can be seen that as wheel 261 rotates its first half revolution from the position shown in FIGURE 20 that gear segment 316 engages gear 315 which, in turn, rotates the knotter bills to form the knot at the termination of the looping and interlooping operations; and during the second half revolution of the wheel gear segment 317 operates in a similar manner to tie knot 23 at the beginning of the succeeding looping and interlooping operations.

Upon completion of each knot, wheel 261 is releasably held in stationary position. The means for releasably holding and centering wheel 261 in the stationary positions previously referred to, comprises a disk 318 (FIGURE 32) fixed to bevelled gear 276 on the shaft 262, said disk having a cam track 319 engaged by roller 320. Cavities 321 and 322 are provided in the cam track 319 and are adapted to receive roller 320 at the respective stationary positions of wheel 261. Roller 320 is mounted upon one end of shaft 325, said shaft being slidably keyed as at 326 in upstanding bracket 327 on bearing 275. Spring 328, mounted around shaft 325, is adapted to yieldingly press the roller 320 toward disk 318. When the roller 320 engages a cavity 321 or 322 the clutch elements 290 and 291 (FIGURES 8, 10, 14 and 39) become disengaged, in a manner previously described, to disconnect the knotter mechanism 205, the strand clamping mechanism 204, and the strand cutter mechanism 206 from the driving source.

*Knotter Bill Stripper 330*

After a knot 23 has been substatnially completed as shown in FIGURE 24, a stripper foot 330 is moved into engagement with the strands 22 at a point relatively close to knotter bills 231 and 310 to strip the knot off the bills. Stripper foot 330 is integral with one end of lever 331 pivoted as at 332 (FIGURES 20 and 32) to bracket 236, said lever having downwardly extending arm 333 upon which a roller 334 is mounted. The roller 334 is adapted to be engaged by cam 335 on wheel 261 to strip from bills 231 and 310 (FIGURE 24) the knot 23 formed at the termination of the looping and interlooping operations. This stripping action takes place during the first half revolution of wheel 261 from the position shown in FIGURE 20.

A similar cam 336 is fixed upon wheel 261 in such a position that it will strip from these bills 231 and 310 a knot 23 formed at the beginning of the looping and interlooping operations, the latter stripping action being effected during the second half revolution of wheel 261 from the position shown in FIGURE 20.

*Strand Cutter 206*

The strand cutting mechanism 206 operates, in timed relation to the clamping mechanism 204, the knotter mechanism 205, and the stripper foot 330, to sever the strands 22 adjacent the tied knot 23. The cutting mechanism 206 comprises two cutters 337 and 338 mounted respectively upon arms 339 and 340 which, in turn, are supported by a restricted portion 245a of shaft 245 (FIGURES 26 through 30). Cutters 337 and 338, as well as their associated operating parts, are constructed opposite hand with respect to one another, but are otherwise identical.

The cutter 337 is adapted to be operated to sever the strands 22 from the knot 23 tied at the end of the looping and interlooping operations, that is, during the first half revolution of wheel 261 from the position shown in FIGURE 20. The cutter 338 is operated in a similar manner during the second half revolution of wheel 261, that is 180 degrees from the position shown in FIGURE 20A, to thereby tie a knot 23 at the beginning of the succeeding looping and interlooping operations.

The table below designates the successive positions of roller 271 in cam groove 260 and the corresponding positions of clamp, cutter and knotting mechanisms during the clamping, knotting and strand severing operations at the end and at the beginning of the bunch looping operations.

FORMATION OF KNOT 23 AT THE END OF BUNCH LOOPING

| Position of Roller 271 positioned in— | Position of Clamp and Cutter | Position of Knotter Bills 231 and 310 |
| --- | --- | --- |
| Groove portion 362 | Figure 26 | Figure 20. |
| Groove portion 364 | Figure 29 | Figures 21 and 22. |
| Groove portion 369 | Figure 28 | Figures 22, 23, 24 and 20A. |

FORMATION OF KNOT 23 AT THE BEGINNING OF BUNCH LOOPING

| Groove portion 369 | Figure 28 | Figure 20A. |
| --- | --- | --- |
| Groove portion 372 | Figure 30 | Figures 21 and 22. |
| Groove portion 375 | Figure 26 | Figures 22, 23, 24 and 20. |
| Groove portion 376 | Figure 28 | Figure 20. |
| Groove portion 362 | Figure 26 | Figure 20. |

Briefly stated, the cutter operating parts and the clamping plates 246 and 247 (FIGURES 26 through 30) occupy three successive positions during the first half revolution of wheel 261 from the position shown in FIGURE 20 and while a knot 23 is tied at the end of the looping and interlooping operations. In other words, the cutter elements are rotated from strand receiving position as shown in FIGURE 26, in a clockwise direction to strand clamping position as shown in FIGURE 29, and then further rotated in a clockwise direction to the third position shown in FIGURE 28 where the strands 22 are severed adjacent the tied knot 23. During the three above-mentioned positions, the roller 271 (FIGURES 20, 21 and 22) is successively disposed in innermost cam groove portion 362, intermediate portion 364, and outermost portion 369, respectively of groove 260.

These same clamp and cutter parts occupy five successive positions during the second half revolution of wheel 261 from the position shown in FIGURE 20, and while the knot 23 at the beginning of the looping and interlooping operations is tied. That is, the disks 246 and 247 rotate counterclockwise from the position shown in FIGURE 28 to clamping position shown in FIGURE 30, and then to clamping and cutting position shown in FIGURE 26. At this time, the disks are rotated in a clockwise direction to the position shown in FIGURE 28 to unclamp the strand pieces 22a, and finally in a counterclockwise direction to the position shown in FIGURE 26. During the five above-mentioned successive positions of disks 246 and 247, the roller 271 is successively disposed in groove portions 369, 372, 375, 376 and 362, respectively, of cam groove 260 (FIGURES 20A, 21 and 22).

Each of the cutter supporting arms 339 and 340 (FIGURES 26 through 30) has a fixed blade 341 secured on its inner face adjacent the clamping mechanism 204, said blades being respectively associated with opposite-handed clippers 337 and 338. Each of the arms 339 and 340 also has a pin 342 rotatably mounted in its outer end, said pin having movable blade 343 fixed on one end thereof and disposed adjacent fixed blade 341. An arm 344 is integral with movable blade 343 (FIGURE 31). This arm has a pin 345 mounted for oscillation in its outer end. A pawl 346 is fixed on one end of pin 345. Pawl 346 is normally urged toward a stop 347, extending laterally from arm 344, by means of a torsion spring 348, said spring having one end thereof secured to the pin head as at 349 and its other end secured as at 350 to arm 344.

In the cutter unit 337, the pawl 346 and its associated blade 343 and arm 344, are normally urged by a torsion spring 356 to rotate in a counterclockwise direction about pin 342 (FIGURES 26, 28 and 29) and into engagement with cam 355 or 361 (FIGURE 27). Spring 356 has one end thereof secured to the head of pin 342 as at 357, and its other end secured to arm 339 of clipper unit 337 as at 358. In the opposite hand clipper unit 338, the pawl 336 is urged by a similar spring 356 into engagement with cams 355 and 361 of this unit.

The cam 355 comprises an outstanding flange of clamp plate 247, said plate also having integral therewith and spaced inwardly from said flange, the second cam 361.

During the opening and closing of the movable blade 343, the pawl 347 is caused to travel around cam 361. When the blade 343 of cutter unit 337 is in open position as shown in FIGURE 26, it is ready to sever strands 22 adjacent the knot 23 to be tied at the end of the looping and interlooping operations. In the latter position of blade 343, the pawl 346 rests upon the high point of cam 355, and the clamp disk 247 is in its extreme counterclockwise position, while roller 271 (FIGURE 20) occupies portion 362 of cam groove 260.

For a short time prior to the strand clamping, severing and knotting operations occurring at the end of the looping and interlooping operations, the cam wheel 261 is releasably held in stationary position, while roller 271 occupies portion 369 of the cam groove 260.

When the point 365 of cam groove 260 (FIGURES 20, 21 and 22) moves beneath roller 271 during the first half revolution of wheel 261 from the position shown in FIGURE 20, the disk 247 and associated cams 355 and 361 (FIGURES 26 and 27) are rotated in a clockwise direction from the position shown in FIGURE 26 by means of a driving connection designated by reference characters 263, 264, 267, 268 and 270, thereby moving the back of pawl 346 of unit 337 into engagement with surface 366 of cam 361 (FIGURE 29). At the same time, the pawl 346 of unit 338 contacts the opposite surface of cam 361. As wheel 261 continues to rotate, the intermediate circumferential portion 364 of cam groove 260 confines roller 271 (FIGURE 20) while the strands 22 are clamped between disks 246 and 247 and holder plate 252 (FIGURE 27); but the cutter blade 343 of cutter unit 337 remains in open position as shown in FIGURE 29. When point 368 of cam groove 260 (FIGURE 20) moves beneath roller 271, the disk 247 is further rotated in a clockwise direction from the position shown in FIGURE 29 to that shown in FIGURE 28, and during the latter rotation, the cam surface 366 of unit 337 rotates from beneath pawl 346, thereby permitting the blade 343 to snap to closed position under the pressure of spring 338 to sever the strands 22 adjacent the knot 23 immediately preceding the previously described stripping action (FIGURE 24).

When the wheel 261 completes its first one-half clockwise revolution from the position shown in FIGURE 20, the roller 271 is disposed in outermost circumferential portion 369 of cam groove 260 in the manner shown in FIGURE 20A, and the ends of severed strands 22 remain clamped by unit 337 between disks 246 and 247 and holder plate 252. At this point, the required number of bunches 20 have been tied and looped upon a stick 21 and the ends of the strands have been looped and tied around the stick as at 23 and 24 (FIGURES 1, 2 and 3), thus completing a looping and knotting cycle.

While the wheel 261 remains stationary at the end of its first one-half clockwise revolution from the position shown in FIGURE 20, the succeeding cycle of operations is begun in the suspension of an assembly of bunches 20 upon the next stick 21. The first of these operations, to be later described, comprises means for doubling back the clamped strands 22 to dotted line position in FIGURE 20 and for positioning intermediate portions thereof in coinciding notches 251 and 229 (FIGURE 28) preparatory to clamping, cutting and knotting. After the strands have been doubled back, the wheel 261 begins its second half clockwise revolution (FIGURE 20A). Upon a slight rotation of wheel 261, the point 370 of cam groove 260 forces roller 271 radially inwardly toward shaft 262 and into intermediate circumferential portion 372 of groove 260, thereby rotating disk 247 in a counterclockwise direction from the position shown in FIGURE 28 to the position shown in FIGURE 30, at which time the severed ends of the two strands 22 are clamped adjacent the unit 337 between holder plate 252 and disks 246 and 247; and the intermediate portions of the strands 22 are clamped adjacent unit 338 between oppositely disposed holder plate 256 and these same disks 246 and 247. The cutter blade 343 of cutter unit 338 (FIGURE 30) is opened to receive the strands 22 upon further counterclockwise rotation of disks 246 and 247.

As the wheel 261 continues to rotate (FIGURE 20A), the gear segment 317 engages gear 315 to rotate the shaft 305 and knotter bills 231 and 310 to tie the knot 23 at the beginning of the looping and interlooping operations. As the knot is completed and stripped from the bills (FIGURE 24), the roller 271 moves into innermost circumferential portion 375 of cam groove 260, thereby further rotating disks 246 and 247 in a counterclockwise direction from the position shown in FIGURE 30 to that shown in FIGURE 26, at which time the clamped ends of strands 22 between the disks and the holder plate 252 are released, and the intermediate portions of strands 22 are severed by cutter unit 338 adjacent the knot 23, leaving one end of each of two short strand portions 22a clamped between the disks and holder plate 256.

Further clockwise rotation of wheel 261 will move roller 271 radially outwardly from shaft 262 in FIGURE 20A, and into outermost circumferential portion 376 of groove 260 to cause the clamping disks 246 and 247 to be moved again to the position shown in FIGURE 28 where the ends of strand portions 29a will be released from between the clamping disks 246 and 247 and holder plate 256 (FIGURE 35). Upon completion of the second one-half revolution of wheel 261, the roller 271 will return to the stationary position in innermost circumferential groove portion 362 as shown in FIGURE 20; and the clamp and cutter parts will then assume the position shown in FIGURE 26 where the notches 229 and 250 will be alined to receive strands 22 following the looping and interlooping operations.

It will be noted by referring to FIGURES 20, 20A, 21 and 22 that the circumferential portions of cam groove 260 are disposed along three concentric circles. That is circumferential portions 362 and 375 are disposed on the innermost circle with the clamp and cutter parts assuming the positions shown in FIGURE 26. Circumferential portions 364 and 372 are disposed on the intermediate circle, corresponding to the clamp and cutter positions shown in FIGURES 29 and 30. Circumferential portions 369 and 376 are disposed on the outer circle, corresponding to the clamp and cutter positions shown in FIGURE 28.

*Strand Tensioner and End Stripper 378*

For the purpose of explaining the strand tensioning and end removing mechanism, let use assume that the looper 18 is in extreme right-hand position in FIGURES 6, 7 and 20, after the requisite number of bunches have been looped and secured to a stick 21 during a left-to-right movement of the carriage 17. It is to be understood, however, that identical operations take place at the end of the looping and interlooping operations during a right-to-left looper movement and while the looper 18 is located in its extreme left-hand position. A complete cycle of operations necessary to suspend a predetermined number of bunches 29 on a stick 21 occurs between the two extreme left and right-hand dotted line positions of looper unit 18 shown in FIGURE 7.

Upon the completion of a stick filled with bunches and with the looper 18 in its extreme right-hand position, the filled stick 21 is replaced with an empty stick between members 98. At this time, the strands 22 have been severed at the terminal knot 23 of the preceding filled stick, leaving the severed ends of the strands clamped by clamping mechanism 204 of unit R. The severed strands extend upwardly from the clamp (FIGURE 20), over hooks 207, and then diagonally downwardly to the arms 75 as shown in bold lines.

The next cycle of operations is then begun to fill the empty stick with bunches 29 held on opposed sides thereof by frames 103. Looper 18 and its guide arms 75 move from the extreme right-hand position to the left and is caused to stop in the position shown in FIGURE 35 near the starting point for the looping and interlooping operations. The interruption of the leftward travel of the looper is effected when roller 432 rides upon the high side of cam 433 (FIGURES 8, 9, 13 and 39) to disconnect carriage shift chain 176 from the driving source. The leftward movement of the looper will cause the portions of the two strands 22 which are disposed between hooks 207 and arms 75 to be guided into notches 229, 239 and 251 (FIGURE 28), and in position for subsequent clamping, knotting and severing. The latter position of the strand portions is illustrated in dotted lines in FIGURE 20. Thus the strands 22 will be doubled upon themselves with the strand ends remaining clamped between disks 246 and 247 and holder plate 252 (FIGURE 28), and with intermediate portions of these strands positioned for clamping, knotting and severing.

It is evident that the movement of looper 18 from its outermost position leftwardly to the position shown in FIGURE 35 must be accompanied by means for maintaining substantially uniform tension in the strands 22 so that undesirable slack will not occur while the strands are being guided into the clamp notches. The details of the tensioning mechanism are shown in FIGURES 5, 6, 8, 10, 13 and 32 through 35.

As the looper 18 and arms 75 move from the extreme right-hand dotted line position in FIGURE 7 to the position shown in FIGURE 35, or from the bold line position to dotted line position in FIGURE 20, a U-shaped finger 378 moves upwardly and laterally from the bold line to the dotted line position shown in FIGURE 32 and approximately to a position located beneath the vertex of the inserted V-shaped portion of strands 22 (FIGURES 7 and 20). Further upward movement of finger 378 from the dotted line position in FIGURE 32 will cause the lower portion of strands 22 to be engaged slightly to the right of hooks 207 (FIGURE 20); and thereafter the strand portions will be raised at a rate functionally related to the horizontal movement of unit 18 and in such a manner that an even tension will be maintained during the carriage movement. When the looper carriage 17 reaches or approaches the stationary position shown in FIGURE 35, each of the two strands 22 will have its ends clamped between notches 250 and holder plate 252 (FIGURE 28); and from the clamped ends, the strands will extend upwardly therefrom (FIGURE 20) and over finger 378 as shown in dotted lines, then downwardly alongside the previously described upwardly extending portions, then into clamp notches 229 and 251 in holder 230 (FIGURE 28), then further downwardly alongside the knotter bills 231 and 310 to V-shaped thread stop 232 (FIGURE 20), and then to yarn guide arms 75.

With the strands 22 in the above-described doubled-back position, the knotter 205 operates to tie a knot 23 immediately preceding the start of the looping and interlooping operations which occur when the looper resumes its leftward movement. At or about the time knot 23 is tied, the clamp disks 246 and 247 rotate in a counterclockwise direction from the position shown in FIGURE 28, first to the position shown in FIGURE 30 and then to the position shown in FIGURE 26; then clockwise to the position shown in FIGURE 28; and finally counterclockwise to the position shown in FIGURE 26. In the position shown in FIGURE 30, the ends of strands 22 are clamped between clamp disks 246 and 247 and holder plate 252; and the intermediate portions of strands 22 are also clamped between clamp disks 246 and 247 and holder plate 256. As the knot 23 is completed, the clamp disks are rotated to the position shown in FIGURE 26, and during this rotation the ends of the strands 22 are released substantially at the same time the intermediate portions of these strands are severed by cutter unit 338 adjacent the newly formed knot 23, leaving two relatively short pieces 22a of strands hanging on finger 378, and with one end of each of said pieces clamped between members 246, 247 and 256. The disks 246 and 247 are then rotated in a clockwise direction from the position shown in FIGURE 26 to that shown in FIGURE 28, thereby clamping the other ends of portions 22a and leaving them hanging on finger 378 as shown in FIGURE 35. Finally, the clamp and cutter mechanisms are returned to the positions shown in FIGURE 26 entirely cleared of strands 22 and strand end portions 22a.

The operating mechanisms for finger 378 is described in detail below. Finger 378 has integral therewith two pins 380, which pins extend downwardly (FIGURES 32 and 33) and are slidably mounted in arm 381, each of said pins having a collar 382 on its lower end below arm 381. A spring 379 is positioned around pin 380 between said arm and finger, whereby the finger 378 will yieldingly engage strands 22 during its upward movement.

Arm 381 is secured to one end of a shaft 383, axially slidable in spaced bearings 384 of U-shaped bracket 385. A collar 386 is secured around shaft 383 between bearings 384. Spring 387 is positioned on shaft 383 between collar 386 and one of the bearings 384, said spring normally tending to force finger 378 and its associated parts to the right, or to bold line position in FIGURE 32.

Shaft 383 has a roller 388 mounted on its end, said roller being adapted to travel around a cam 390 (FIGURES 33 and 34) as the finger 378 is moved successively from the bold line position in FIGURE 32, laterally and upwardly to the dotted line position; then vertically upwardly beneath strands 22, or the portions 22a to the position shown in FIGURE 33; and then laterally to the right to remove the strand pieces 22a, which have been stripped from the clamping mechanism 204 by finger 378, from the hooks 207. The finger 378 finally moves downwardly to the bold line position shown in FIGURE 32, where the short pieces 22a may be manually removed.

As the finger 378 travels the above-mentioned path, the roller 378 successively moves from the dotted line position in FIGURE 33, vertically upwardly along surface 391; then diagonally and upwardly along the lower surface of a pivoted arm 392; then continuing along cam surfaces 393, 394, 395 and 396; and finally, vertically downwardly along surface 391.

One end of the arm 392 is secured to a pin 397 (FIGURES 33 and 34), said pin being rotatably mounted in bracket 398 and having a torsion spring 399 therearound. One end of the spring 399 is secured to bracket 398 as at 400 and its other end to the head of pin 397 as at 401 thereby yieldably urging arm 392 to bold line position in FIGURE 33. It is thus seen that roller 378 will be permitted to move vertically downwardly past pivoted arm 392 to the dotted line position, but upon upward movement from the latter position, the roller 378 will be deflected, laterally and upwardly to the left by arm 392 along the previously described path.

The bracket 398 is supported upon cantilevered frame portion 128 of the framework 10 (FIGURE 33) and has integral therewith spaced lugs 402 in which a rod 403 is mounted for vertical sliding movement. The upper end of rod 403 has the previously described U-shaped bracket 385 mounted thereon, and its lower end has an axially aligned rack 404 extending downwardly therefrom and meshing with a spur gear 405 (FIGURES 6 and 33). Gear 405 is secured to frame portion 123 by means of shouldered bolt 406. Integral with gear 405 is a smaller gear 408 meshing with a horizontally disposed rack 409, said rack being slidably mounted in bracket 410 and having its other end pivoted as at 411 to a link 412.

Link 412 has its other end pivoted as at 414 to the upper end of a lever 415, which lever is pivoted intermediate its ends as at 416 (FIGURES 6, 8, 10 and 13) to end frame 10. The lower end of lever 415 has a roller 417 which engages cam 418 (FIGURE 39), said cam being suitably shaped to impart the desired upward movement to finger 378 so that the proper strand tension will be maintained as the carriage 17 and looper 18 moves from its right-hand outer position as shown in FIGURE 7 to the position shown in FIGURE 35. Cam 418 is fixedly secured to cam shaft 217. A spring 419 normally holds roller 417 in engagement with cam 418.

*Drive for Camshafts*

As stated earlier, the various operations occurring during the left-to-right movement of looper 18 (FIGURE 6) from the beginning of the looping and interlooping operations on a stick 21 to its extreme right-hand position of the looper, and also the succeeding operations occurring during the right-to-left movement of the looper from the extreme right-hand position to the position shown in FIGURE 35, are controlled by the mechanism located in the right unit R of the apparatus (FIGURES 6, 7, 8 and 10). Similarly, the operations occurring during the continued right-to-left movement of the looper 18 to the end of the cycle, and the operations in the succeeding cycle up to the beginning of the bunch looping operation are located in unit L (FIGURES 6, 7, 8 and 13).

When, as described in the preceding sections, the knot 23 has been tied and the strands 22 severed therefrom during the right-to-left looper movement at the beginning of the looping and interlooping operations, all of the controlling cams located in the right unit R are disconnected from their driving source. At this time, the controlling cams in left unit L are also disconnected. Immediately following disconnection of the cams of the unit R from the driving source, a shift mechanism, to be described later, will operate to connect the cams of the unit L to the driving source. The driving and control mechanisms for the cams in the right and left units R and L respectively are identical for all practical purposes, and are shown in detail in FIGURES 8, 10, 11, 12 and 13. A description of these elements follows.

Cam shaft 217 has fixedly secured thereon a ratchet 437 (FIGURE 11) adapted to be engaged by pawl 438 pivoted as at 439 to a gear 440. Gear 440 is rotatably mounted on shaft 217 and comprises one of a series of reduction gears described below and located between shafts 178 and 217. A spring 441 normally urges the free end of pawl 438 into engagement with the teeth of ratchet 437 and thereby affords a one-way drive for the cam shaft 217. Gear 440 meshes with a smaller gear 442 loosely mounted on shaft 178 (FIGURES 10 and 13), the latter gear having secured thereto and also loosely mounted on shaft 178, a larger gear 443. Gear 443 meshes with a smaller gear 444 loosely mounted on shaft 217 and fixedly secured to larger gear 445, which gear is also loosely mounted on shaft 217. Gear 445 meshes with a larger gear 446 loosely mounted on shaft 178, said gear having a clutch face on the hub thereof which is adapted to engage a similar clutch face on clutch element 447. Clutch element 447 is slidably keyed on shaft 178 and has a peripheral groove 450 therein in which pins 451 of yoke 452 are adapted to fit.

Yoke 452 is integral with the upper end 453 of a two-piece lever 454 (FIGURE 12), pivoted as at 455 to end frame 10. The lower end 456 of lever 454 has limited rotary movement relative to the upper end 453. In order to provide such relative movement, the end 453 has a stud bolt 458 secured therein with its intermediate portion penetrating a slot 459 in projecting lug 456a on the upper portion of lower end 456. A spring 460 is confined around bolt 458 and normally tends to hold the ends 453 and 456 in the positions shown in FIGURE 12, but will permit limited relative clockwise rotation of end 456 or limited relative counterclockwise rotation of end 453 when an occasion demands. The lower end 456 has a roller 462 mounted thereon which engages the surface of cam 463. A spring 464 normally holds roller into engagement with the cam.

When the cam 463 rotates to move roller 462 from depression 461 to the high side of the cam (FIGURE 39) to connect the clutch faces between members 446 and 447, the teeth of the opposing clutch faces may temporarily engage one another before becoming intermeshed. The two-piece lever 454 permits delayed clockwise rotation of the upper lever end 453 under such circumstances, while the cam 463 is imparting clockwise rotation to the lower end 456 and until the clutch faces intermesh.

The crank 180, mounted on the end of the right-hand shaft 178 (FIGURES 6, 8 and 10), is employed for manual operation.

*Drive Shift Mechanism 485, 485a*

As above stated, during the right-to-left movement of looper 18 (FIGURE 35), the controls associated with the right unit R automatically become disconnected from the drive shaft 178 upon the completion of the tying of knot 23, said knot being tied immediately preceding the looping and interlooping operations. At that time the controls associated with both the right and the left units R and L respectively, are disconnected from the source of power, which source, in the present instance, is derived from crank 180. To begin the looping and interlooping operations, upon further right-to-left movement of looper 18, it is first necessary to connect the source of power 180 to the controls associated with the left unit L. This is done by rotating the cam shaft 217 associated with the left unit L in a counterclockwise direction (FIGURE 39) until arrow 467 on cam 463 is rotated from a position opposite arrow 495 to a position opposite arrow 496. When the arrows 467 and 495 of unit L are positioned opposite one another all of the cams associated with this unit are disconnected, but upon movement of arrows 467 and 496 in coinciding relation, the unit L becomes connected.

The mechanism described below is employed to automatically effect this shift. Fixedly secured upon each of shafts 217 (FIGURES 6, 10 and 13) is a ratchet wheel 471, the teeth of which are adapted to be engaged respectively by pawls 472 pivotally secured to the upper ends of levers 473 and 474 by means of a pin 475. The free ends of pawls 472 are yieldingly held in engagement with the teeth of ratchet wheels by means of torsion springs 476 disposed around pins 472. Levers 473 and 474 are mounted for oscillation respectively on shafts 217 associated with left unit L and right unit R. It will be observed in FIGURES 6 and 39 that levers 473 and 474 and their respective pawls 472 are designed to advance ratchet wheels 471 and their associated shafts 217 step by step in counterclockwise directions.

Levers 473 and 474 have integral therewith arms 478 and 479, respectively, the clockwise rotation of said arms and associated levers being limited by stops 481 and 482 projecting from the end frames 10 of the units L and R respectively. Tension springs 483 yieldingly urge the arms into engagement with the respective stops.

Integral with the upper end of lever 474 (FIGURES 6 and 10) is a U-shaped fork 484, the inner surfaces of which are disposed adjacent the lower and opposite sides of the lower section of a shift chain 485, said chain having a shift cam or projection 485a secured thereto. Shift chain 485 is mounted upon sprockets 486 and 487. Sprocket 486 is fixedly mounted on shaft 178 of unit L, whereas sprocket 487 is loosely mounted on shaft 178 of unit R. Sprocket 487 is connected to shaft 178 or unit R by a series of reduction gears to be described later.

A U-shaped fork 488, similar to fork 484 (FIGURES 6 and 13) has its inner surfaces disposed adjacent the upper and opposite sides of shift chain 485, said fork being integral with one leg of bell crank lever 489 pivoted as at 490 to the end frame 10 of the unit L. The other leg of lever 489 has pivoted thereto as at 491, the upper end of a link 492; and the lower end of the link is pivoted as at 493, to previously described arm 478.

The U-shaped fork members 484 and 488 permit movement of shift chain 485 therethrough, but will not permit passage therethrough of the shift cam 485a; consequently, as the cam 485a engages the U-shaped forks 484 or 488, rotation will be imparted to levers 474 and 489, respectively. Immediately preceding the beginning of a right-to-left looping and interlooping operations (FIGURE 35), the cams of both the units L and R are disconnected from the driving source, and at this time, the shift cam 485a engages fork 488 which, in turn, will rotate cam shaft 217 of unit L (FIGURES 6 and 39) through the connecting linkages 489, 492, 478 and 473 until arrows 467 and 496 are oppositely positioned to effect the connection. Arrows 495 and 496 are disposed upon dial circles 470.

In a similar manner, the cam 485a will engage fork 484 immediately preceding the beginning of left-to-right looping and interlooping operations to thereby rotate the cam shaft 217 of unit R until arrows 467 and 496 are oppositely positioned.

Sprocket 487 of unit R is connected to shaft 178 by a series of intermeshing reduction gears 501, 502, 503 and 504 (FIGURES 5, 8 and 10). Sprocket 487 is integral with gear 501, said gear 501 meshing with smaller gear 502 integral with a larger gear 503. Gear 503 is loosely mounted on shaft 217. Gear 503 meshes with larger gear 504 fixedly secured to shaft 178.

The shift chain 485 makes one-half of a complete turn around supporting sprockets 486 and 487 for each operating cycle. In other words, a full quota of bunches 20 are looped and secured to a stick 21 for each one-half revolution of chain 485. For example, during the first cycle or one-half revolution of the chain, the looper 18 travels from the left to the right dotted line position (FIGURE 7) to fill the stick 21 with bunches 20; and during the second cycle or second one-half revolution of the chain, the looper travels from the right to the left while the succeeding stick is filled.

The shift cam 485a is so positioned on shift chain 485 that it will contact U-shaped fork 488 to rotate the cams of unit L to operative position at the beginning of the right-to-left looping and interlooping operations (FIGURE 39). This same cam 485a will similarly contact the U-shaped fork 484 to move the cams of unit R to operative position at the beginning of the left-to-right looping and interlooping operations, that is, as the looper 18 moves to the right from a position at the unit L corresponding to that shown in FIGURE 35.

When either of the cam shafts 217 of units L or R is rotated in a clockwise manner (FIGURES 6 and 39) to shift a set of cams to operative position, the teeth of ratchet wheel 437 (FIGURES 10, 11 and 13) rotate backwardly underneath pawl 438, and therefore the positions of the chain of reduction gears, designated by reference characters 440, 442, 443, 444, 445 and 446, will not be disturbed.

*Stick Loop Tightening Mechanism*

As heretofore stated, means are provided for tightening the end loops 24 (FIGURES 1, 2 and 3) around the stick 21 after the looping, interlooping and knotting operations have been completed. This result is obtained by rotating the end loops 19, and the bunches 20 held thereby (FIGURE 2) in the directions indicated by the arrows and from the bold line positions to the dotted line positions 19a. In other words, the end bunch holders 115 are rotated from the positions shown in FIGURE 14 to those shown in FIGURE 15A.

Holder 115 is mounted for oscillation upon an arcuate rim 510 by means of an arcuate flange segment 115a (FIGURE 16), said flange extending laterally and around the lower portion of the rim. Cooperating with segment 115a to confine holder 115, is an arcuate gear segment 511 extending laterally above the upper portion of the rim. Rim 510 is integral with bracket 512 which, in turn, is integral with the end of rectangularly-shaped pin 513 mounted for sliding movement in bearing 514 on plate 104. Pin 513 has a head 515 integral therewith, which head is adapted to engage the bearing 514 to limit the outward movement of the bracket 512 and the members mounted thereon in a direction substantially parallel to stick 21.

A rod 516 is slidably mounted in a bearing 517, which bearing is secured to plate 104 (FIGURES 6, 14 and 15A), one end of said rod being secured to the head of pin 513 and the other end to a link 518 as at 519. A spring 520 is disposed around rod 516 and positioned between bearing 517 and pin head 515, said spring normally urging the rod and associated parts outwardly toward the end of the stick to the extended position shown in FIGURE 15A. The other end of link 518 is hook-shaped (FIGURE 6) and is secured to a disk 521 as at 522, said disk being fixedly mounted on a shaft 523. The latter shaft is rotatably mounted in bearing 524 on the exterior surface of plate 105. A hand disk or knot 525 is fixedly secured on the outer end of shaft 523.

It can be seen that the hooked ends of links 518 permit the connecting points 522 to rotate in a clockwise direction (FIGURE 6) beyond dead center positions until the intermediate portions of the links engage the disk hub (FIGURE 14). With the parts 521 through 525 in the positions shown in FIGURES 6 and 14, the end bunch holders 115 are latched in retracted position against the tension exerted by springs 520. In such latched positions, the open sides of these bunch holders 115 face outwardly toward brackets 127.

After the looping, interlooping and knotting operations have been performed in connection with a stick, the companion bunch holders 103 together with the looped stick of tobacco held therebetween, are removed from between the supporting brackets 127. At this time, it is often necessary to tighten the stick loops 24, and also to eliminate undesirable slack in the end bunch loops 19. This result is attained by rotating the end bunches outwardly toward the ends of the stick, as heretofore stated. The specific structure effecting this rotation comprises gear segment 511 which meshes with a pinion 527, said pinion being rotatably mounted on bracket 512 as at 528. Pinion 527 also meshes with horizontally disposed rack 529, secured to plate 104.

When the bunch holders 103 and the stick filled with looped bunches 20 have been removed from between the bracket 127, the end bunches are caused to be rotated outwardly to the position shown in FIGURE 15A, by turning the hand disk or knob 525 so as to release the parts from latched positions. For example, the rotation of a knob 525 in a counterclockwise direction in FIGURE 6 will tighten the end bunches held by a bunch holder 103, there shown. When the knobs 525 are thus rotated, the springs 520 will be released to move pins 513, and brackets 512 outwardly, thereby causing the parts 19, 115, 511 and 527 to rotate in the direction indicated by the arrows in FIGURE 15A where the end loops assume positions 19a. At the same time the loops 24 around the stick 21 will be tightened.

In FIGURE 4, a slightly modified form of stick or holder 21a is shown, said stick being provided with a suitable notch 21a near each end thereof, but positioned outwardly a short distance from the terminal bunches 20.

Notch 21b is adapted to receive stick loop 24 to limit inward sliding movement of the loop. The weight of the suspended bunches 20 produces strand tension, which, in turn, tends to pull the stick loops inwardly and thereby loosen the intermediate bunch loops 19. Under normal conditions, the end loops are sufficiently tightened around the stick to prevent objectionable slippage, especially when the end loops 19a and 24 are tightened by the above-described stick loop tightening mechanism; however, the end notches serve as an additional securing means where desired.

*Method of Operation*

The method of operation is diagrammatically illustrated in FIGURES 37, 38, 39 and 41. The method described below comprises two successive cycles of operation.

The first cycle entails the suspension of a full quota of bunches 20 upon a stick 21 while the shift chain 485 rotates exactly one-half revolution about sprockets 486 and 487 and during which the looper 18 moves from extreme right-hand position to extreme left-hand position (FIGURE 6). The second and succeeding cycle entails identical operations upon another stick 21 while the shift chain 485 rotates exactly another one-half revolution, during which time the looper 18 moves in the opposite direction.

Briefly set forth below is a description of the operation of the various elements substantially in chronological order. When looper 18 is in its extreme right-hand position, the arm 187 has engaged bolt 189 (FIGURES 8 and 35) and rotated shift arm 184 in a clockwise direction to disengage end 183 from lug or projection 181 of chain 176. This disengagement stopped the looper in the extreme position shown. Simultaneously with the disengagement of end 183, the opposite end 182 of the shift arm was rotated upwardly and into an operative relationship with the lower section of the chain 176. In the latter position of end 182, a projection 181 on the lower section of the chain will move from right to left, and upon contact with end 182, will move looper 18 therewith to begin the first cycle.

At the beginning of the first cycle, the ends of strands 22 are held by clamp 204, from which the strands extend upwardly over hooks 207, and then diagonally downwardly to arms 75 as shown in bold lines in FIGURE 20. At this time, cam shaft 217 of unit R is connected to operating crank 180 at clutch element 447 (FIGURES 8 and 10). Cam shaft 217, in turn, is connected to looper chain 176 at clutch element 426 and to lowered tensioner finger 378 of unit R at cam 418 (FIGURES 8, 10, 20 and 32); and to the raised right strand hooks 207 at cam 216 (FIGURES 6, 8, 10 and 32). Also at this time, cam shaft 217 of unit R is disconnected from looper drive shaft 15 at clutch element 240 (FIGURES 8 and 10), and the looper arms 75 are latched in position D (FIGURE 37) by roller 140 engaging detent 141 (FIGURES 8, 16 and 19). The clamp mechanism 204, the knotter mechanism 205, and the cutter mechanism 206 of unit R, are disconnected from cam shaft 217 at clutch element 290 (FIGURES 8 and 10).

It should also be noted that at the beginning of the first cycle and with looper 18 in the extreme right-hand position (FIGURE 6), the cam shaft 217 of unit L is disconnected from the operating crank 180 as at clutch element 447 (FIGURES 8 and 13), and consequently, the left tensioner finger 378 and the left strand hooks 207, driven through said element 426, are also disconnected. Cam shaft 217 of unit L is also disconnected from looper chain 176 at clutch element 426, and from the looper drive shaft 15 at clutch element 240 (FIGURES 8 and 13). The relative positions of the cams of the unit L at this time are shown in FIGURE 39 while the overall relationship is shown in FIGURE 41.

With an empty stick 21 inserted between members 98, and with two bunch holders 103 filled with bunches 20 positioned respectively on opposite sides of the stick (FIGURES 6 and 14), the right-to-left cycle is begun. By turning crank 180 clockwise in FIGURE 6, looper chain 176 is rotated, and subsequently projection 181 engages end 182 of shift arm 184 to move the looper 18 to the left to the position shown in FIGURE 35, at which time the driving connection between crank 180 and chain 176 of unit R is severed at clutch element 426 and the looper 18 assumes a stationary position. In this stationary position, the strands 22, with their ends held by clamp 204, have been doubled back and guided by baffle plates 227 and 228 (FIGURE 5) into clamp notches 251 (FIGURE 28) and in the dotted line position shown in FIGURE 20.

Simultaneously with the horizontal travel of looper 18 from extreme right-hand position (FIGURE 6) to the stationary position (FIGURE 35), the right tensioner finger 378 moves vertically upwardly in timed relation thereto by means of cam 418 of unit R (FIGURE 10) and in such a manner as to maintain uniform tension on the doubled-back strands 22 (FIGURES 20 and 33).

With the tensioned strands positioned in notch 251 as described, and extending downwardly alongside knotter bills 231 and 310, the driving connection between crank 180 and knotter 205 of unit R is connected as at clutch element 291 (FIGURE 10), that is, the roller 297 enters depression 301 of cam 298 to cause the clutch to become engaged (FIGURE 39). Immediately before the clutch becomes engaged, the wheel 261, which operates the clamp, cutter and knotter mechanisms, is stationary and positioned as shown in FIGURE 20A. In other words, the roller 271 occupies the outer portion 369 of cam groove 260, and the open notches 251 of clamp 204 coincide with notches 229 as shown in FIGURE 28 to permit entry of strands 22.

As the cam wheel 261 rotates in a clockwise direction the roller 271 successively occupies four positions in groove 260. When the roller passes from outer portion 369 to intermediate portion 372, the clamp and cutter mechanisms are caused to assume the position shown in FIGURE 30 where the ends of strands 22 will be clamped at notches 250 and the intermediate portion of the strands will be clamped at notches 251. Upon further rotation of wheel 261, knotter gear 315 (FIGURE 20A) will engage gear segment 317 to cause the knotter bills 231 and 310 to rotate to form the knot 23 (FIGURES 20, 22, 23 and 24). A short time prior to completion of knot 23 as shown in FIGURE 24, the roller 271 enters the second or innermost portion 375 of cam groove 260, thereby moving the clamp and cutter mechanisms to the position shown in FIGURE 26 at which point the ends of strands 22, which have been clamped at notch 250, are released while the intermediate portions of strands 22 clamped at notch 251 are severed by cutter unit 338, thus leaving two short strand portions 22a with one end of each portion clamped.

As the knot 23 is completed, the foot 330 (FIGURES 20 and 24) moves upwardly to remove the knot from the bills 231 and 310, the latter movement being effected by the engagement of roller 334 with cam 336 on the periphery of wheel 261. Simultaneously, with the completion of knot 23, roller 271 moves to the third position, or into the outermost portion 376 of cam groove 260 to cause the clamp and cutter mechanisms to assume the position shown in FIGURE 28. In the latter position the severed strand portions 22a, clamped at notch 251, are released and left suspended upon tensioner finger 378. The roller 271 then moves to the fourth position as shown in FIGURE 20, or to the innermost portion 362 of cam groove 260, thus returning the clamp and cutter mechanisms to the positions shown in FIGURE 26.

With the knot 23 formed, at the beginning of the looping and interlooping operation, further rotation of operating crank 180 will cause roller 462 to move into depression 461 of cam 463 (FIGURES 10 and 39) to cause the driving connection between the crank and the cam shaft 217 of unit R to become disconnected as the arrow 467 assumes a position opposite arrow 495. Thus, both of the cam shafts 217 of the units R and L are disconnected from crank 180 after knot 23 has been formed. The knot 23 having been formed while the arms 75 of looper R are releasably held in position D (FIGURE 37), the steps have been completed preliminary to the formation of stick loop 24 and the succeeding bunch loops 19.

When the cam shaft 217 of unit R becomes disconnected from crank 180, the projection 485a on shift chain 485 is approaching fork 488 of unit L (FIGURES 6 and 13). Upon engagement of members 485a and 488, the associated cam shaft 217 will be advanced counterclockwise, through the linkage 489, 492, 473, 472 and 471, until the arrow 467 of unit L (FIGURE 39) assumes a position opposite arrow 496. Thereafter, the remaining operations on stick 21 will be controlled by unit L.

When the arrow 467 is rotated to a position opposite arrow 496 of unit L (FIGURE 39), the operating crank 180 is connected to unit L as follows; to cam shaft 217 at clutch element 447; to the looper shifting chain 176 at clutch element 426; and to the looper operating shaft 15 at clutch element 240 (FIGURE 13). As looper 18 continues movement to the left from the position shown in FIGURE 35, the looper arms 75 while being held stationary relative to their axes of rotation, rotate bodily about a common axis to interloop the strands 22 as at 25a as illustrated at position D. Then arms 75 make one revolution about their respective axes to interloop bunches 20 at positions C. The two last-named operations alternately occur until all of the bunches are looped as at 19 and the two strands 22 interlooped as at 25 and 25a.

At the end of the bunch looping and stick looping operations the arms are releasably latched in position A (FIGURE 37) as a result of the engagement by roller 140 of detent 142 (FIGURES 16 and 19). With the arms held in position A, the looper continues movement to extreme left-hand position (FIGURE 7).

A short time before looper 18 reaches the point where looping and interlooping ceases, the strand hooks 207 of unit L are lowered by cam 216 (FIGURES 13, 15, 32 and 40) so that the hook points will be disposed below the horizontally disposed portions of strands 22 extending from the interloop 25a to the arms 75 at the extreme left-hand position. Hence, the divergent strands 22 will pass on opposite sides of the hook points as the looper passes the lowered strand hooks 207.

In order to guide the divergent strands 22 into the upward path of the hooks, arms 221 are rotated to upright position by cam 225, as shown in dotted lines in the left-hand portion of FIGURE 7, each of the strands 22 being disposed between the shank of a hook and an upright arm 221. As the looper approaches its extreme left-hand position, the strands 22 will be pressed inwardly by arms 221 against the shanks of hook members 207 in a manner similar to that shown in FIGURES 15 and 40. The hooks 207 will then be raised by cam 216 to position the strands into coinciding notches 229 and 250 of clamp 204 of unit L, or to a position similar to that shown in bold lines in FIGURE 20.

When the looper reaches extreme left-hand position, the leg 187 (FIGURES 6, 16 and 35) engages bolt 189 to rotate arm 184 counterclockwise and thereby disengage end 182 from engagement with projection 181 on chain 176 to stop movement of the carriage.

Further rotation of the operating crank 180 will operate the clamping, knotting and strand cutting mechanism of unit L, during which the roller 271 (FIGURE 20) moves from groove portion 362 to groove portion 364, and then to groove portion 369. At the same time, the clamp and cutter mechanisms respectively move from the positions shown in FIGURE 26 to the position shown in FIGURE 29, and then to the position shown in FIG- URE 28. During the above movements, the knotter bills 231 and 310 successively assume the positions shown in FIGURES 20, 21, 22, 23 and 24 to tie the knot 23 at the end of the looping and interlooping operations.

During the final rotation of operating crank 180 the roller 462 enters depression 461 of cam 463 (FIGURES 13 and 39) to disconnect the cam shaft 217 of unit L from the operating crank 180, thus ending the right-to-left operating cycle.

Finally the bunch holders 103, together with the stick 21 and the suspended bunches 20, are removed from the apparatus. Before separating the holders 103 from the stick and the suspended bunches, end loops 19 and the bunches 20 held thereby are rotated outwardly to positions 19a (FIGURE 2) in order to tighten the stick loops 24 and eliminate any objectionable strand slack at the ends of the stick. The mechanism for tightening the end loops is shown in detail in FIGURES 6, 14 and 15A.

The succeeding cycle is identical to that previously described, except the various operations occur as the looper moves from extreme left-hand position to extreme right-hand position, and while the chain 485 makes its second one-half revolution about sprockets 486 and 487.

In the drawings and specification, a preferred embodiment of the invention is disclosed, and although specific terms are employed they are not intended for purposes of limitation, the scope of the invention being set forth in the following claims:

I claim:

1. Apparatus for interlooping under a stick the butts of tobacco hands with strand material, comprising means for removably supporting said stick in substantially horizontal position, means for supporting two rows of said hand butts respectively on opposite sides of a supported stick, said butts being vertically disposed and projecting below the bottom of said stick, means movable longitudinally of said rows of hand butts for successively forming interconnected loops of the strand material around and between the projecting hand butts of the opposed rows, and means operable upon the completion of said loop forming operations for reversing the direction of travel of said loop forming means, and means operable during the reverse travel of said loop forming means for repeating said looping operations upon rows of hand butts similarly supported on opposite sides of a succeeding stick.

2. Apparatus employing strand material for binding spaced hands of tobacco leaves upon elongated holders comprising, means for supporting two rows of said hands respectively adjacent opposite sides and transversely of a holder, each hand in one row being paired with a hand in the opposite row, a pair of strand guides movable longitudinally of said rows along a path adjacent said holder, said guides being respectively rotatable about the hands of successive pairs to form strand loops therearound, and means operable alternately with the looping of each said pair of hands for interlooping the strand material extending from the respective looped hands.

3. Apparatus as described in claim 2, and further comprising means operable immediately preceding the beginning and upon the termination of said looping and interlooping operations for securing the strand material around said holder.

4. Apparatus employing strand material for binding tobacco leaves upon elongated holders comprising, means for supporting spaced hands of tobacco leaves in substantially parallel rows on opposite sides and transversely of said holder, the hands in one row being respectively paired with the hands in the opposite row, means for successively forming interconnected loops of strand material about and between oppositely disposed hands, and means operable preceding the beginning and upon the termination of the loop forming operations for securing the strand material around said stick.

5. In an apparatus employing strand material for interlooping two rows of tobacco leaves under an elongated horizontally disposed holder, the butt ends of said leaves being vertically disposed and positioned respectively adjacent opposite sides of said holder, means movable longitudinally of said rows for interlooping the butts of said oppositely disposed rows with said strand material along a path adjacent the holder, means operable preceding an interlooping operation for securing the strand material around the holder, and means operable upon completion of the interlooping operation for again securing the strand material around the holder.

6. In apparatus of the class described, the combination of an elongated holder, means for supporting two rows of tobacco leaves respectively adjacent opposite sides and transversely of said holder, means employing strand material for binding said oppositely disposed layers to said elongated holder, and means operable for securing said strand material around said holder at each end of said bound rows.

7. Apparatus employing strand material for binding tobacco leaves upon successive elongated holders comprising, a holder supporting means, means for supporting two rows of tobacco leaves respectively adjacent opposite sides and transversely of a supported holder, means for fastening said rows one to the other with said strand material along a path adjacent said holder, means for imparting relative reciprocal movement between said holder supporting means and said fastening means at least from one end of said supported rows to the other, and means for operating said fastening means during each direction of relative travel between said supporting and fastening means, whereby two rows of leaves are fastened one to the other and bound upon opposite sides of a holder during said relative travel in each direction.

8. Apparatus as set forth in claim 7, and further comprising means operable at the beginning and at the end of the row-fastening operation on each holder for tying said strand material around the holder.

9. Apparatus employing strand material for binding tobacco leaves and the like upon successive elongated holders comprising, means for supporting a holder, means for supporting two rows of tobacco leaves respectively adjacent opposite sides and transversely of a supported holder, looping means, said holder support and said looping means being mounted for relative reciprocal travel at least from one end of said supported rows to the other and along a path adjacent the holder, and means operable during the relative travel in each direction between the looping means and the holder support for looping together the oppositely disposed rows of leaves to thereby bind the latter upon opposite sides of the holder.

10. Apparatus as set forth in claim 9, and further comprising means operable at the beginning and at the end of the looping operation associated with each holder for forming a closed loop of strand material around the holder.

11. In an apparatus employing strand material for securing tobacco leaves onto an elongated holder, the combination of a support for engaging the end of said holder, means for supporting two rows of tobacco leaves respectively adjacent opposite sides and transversely of a supported holder, and sequentially operable mechanism comprising means movable longitudinally relative to said holder for attaching said rows one to another with said strand material along a path adjacent the holder, and means for securing said strand material around said holder at a point adjacent the end of the attached rows.

12. In an apparatus employing strand material for securing tobacco leaves onto an elongated holder, the combination of a support for engaging the ends of said holder, means for supporting two rows of tobacco leaves respectively adjacent opposite sides and transversely of a supported holder, and sequentially operable mechanism comprising means for securing said strand material around said holder at a point adjacent the beginning of the oppositely positioned rows, and means movable longitudinally relative to said holder for attaching said rows one to the other with said strand material and along a path adjacent the holder.

13. Apparatus employing strand material for binding the butt ends of two rows of spaced tobacco bunches positioned respectively adjacent opposite sides and transversely of successive elongated holders comprising, a holder supporting means, a bunch looping means, said two last-named means being mounted for relative reciprocal travel at least from one end of said positioned rows to the other and along a path adjacent the holder, and means alternately operable during the relative travel in each direction between the looping means and the holder supporting means for looping individual strands respectively around each of a pair of oppositely disposed bunches and for interlooping the respective strands to thereby bind said rows of leaves upon opposite sides of a holder.

14. In an apparatus employing strand material for binding the butts of two rows of equally spaced tobacco bunches positioned respectively on opposite sides and transversely of an elongated holder, each bunch in one row being paired with a bunch in the opposite row, a looper mechanism comprising a pair of strand guides, means including a pair of shafts for rotating said guides respectively in circular paths substantially tangent to one another, means for rotating said guides and their respective shafts bodily about a third shaft, means for mounting said guides and said rotating means therefor for bodily movement longitudinally of the butts of said bunch rows, means operable as said guides move longitudinally past a pair of said bunch butts to cause one of said guides to encircle and loop a strand around one of the bunch butts and the other of said guides to encircle and loop a strand around the opposite bunch butt of the pair, means operable upon encirclement of said pair of bunch butts for fixing said guides against rotation about their individual axes and in a position intermediate said two rows of bunch butts, means operable during said longitudinal bodily movement of the fixed guides toward the succeeding pair of bunch butts for bodily rotating the guides about said third shaft to cause the strands emanating from the respective guides to be interlooped, and means for repeating said alternate looping and interlooping operations during the further longitudinal bodily movement of the guides.

15. Apparatus as defined in claim 14 and further comprising means operable immediately preceding the beginning and upon the termination of said looping and interlooping operations for securing the strand material around the holder.

16. Apparatus as defined in claim 14 wherein the means for rotating said guides in circular paths substantially tangent to one another comprises a rotatable internal gear and an intermeshing relatively rotatable pinion, and wherein said means for bodily rotating said guides about the third shaft comprises means for preventing relative rotation between said internal gear and said pinion.

17. Apparatus as defined in claim 15 wherein the means for rotating said guides in circular paths substantially tangent to one another comprises a rotatable internal gear and an intermeshing relatively rotatable pinion, and wherein said means for bodily rotating said guides about the third shaft comprises means for preventing relative rotation between said internal gear and said pinion.

18. In an apparatus of the class described, the combination of an elongated holder, means for supporting adjacent opposite sides of said holder two transversely disposed rows of tobacco leaves respectively, each bunch in one row being paired with a bunch in the opposite row, and means including an epicyclic gear train bodily movable longitudinally of said rows for alternately looping two strands respectively about each bunch of a pair and for then interlooping the strand portions extending from the looped bunches.

19. Apparatus employing strand material for looping tobacco leaves and the like, comprising means for supporting two rows of spaced hands of said leaves in parallel relationship, the hands in one row being paired with the hands in the other row respectively, a pair of strand guiding means, each of the latter having a strand emanating therefrom, means for rotating said guiding means and emanating strands in circular paths to respectively loop the hands of one of said pairs, means operable upon the looping of said pair for concurrently arresting the rotation of said guiding means and for bodily rotating the latter about a common axis to interloop said strands, and means for alternately repeating the above-mentioned strand looping and strand interlooping steps with respect to the remaining pairs of spaced hands in said rows.

20. Apparatus as defined in claim 19 wherein the means for rotating said guides in circular paths comprises a rotatable internal gear and an intermeshing relatively rotatable pinion, and wherein said means for bodily rotating said guides about the third shaft comprises means for preventing relative rotation between said internal gear and said pinion.

21. Apparatus as defined in claim 19 wherein said circular paths of said strand guiding means respectively lie in intersecting planes forming a dihedral angle therebetween.

References Cited in the file of this patent

UNITED STATES PATENTS

| | | |
|---|---|---|
| 413,393 | Farmer | Oct. 22, 1889 |
| 454,097 | Warren | June 16, 1891 |
| 2,327,252 | Dickerson | Aug. 17, 1943 |
| 2,456,622 | Clark | Dec. 21, 1948 |
| 2,652,932 | Funnell | Sept. 22, 1953 |
| 2,785,808 | Weisner | Mar. 19, 1957 |
| 2,904,193 | Poythress | Sept. 15, 1959 |
| 2,952,371 | Smith | Sept. 13, 1960 |